United States Patent
Roekens et al.

(10) Patent No.: US 11,125,492 B2
(45) Date of Patent: Sep. 21, 2021

(54) SYSTEMS AND METHODS FOR VACUUM COOLING A BEVERAGE

(71) Applicant: The Coca-Cola Company, Atlanta, GA (US)

(72) Inventors: Jurgen Roekens, Kampenhout (BE); Jacobus P. M. Dessing, Hoofddorp (NL); Michael Gary Izenson, Hanover, NH (US)

(73) Assignee: THE COCA-COLA COMPANY, Atlanta, GA (US)

(*) Notice: Subject to any disclaimer, the term of this patent is extended or adjusted under 35 U.S.C. 154(b) by 168 days.

(21) Appl. No.: 16/345,037

(22) PCT Filed: Oct. 25, 2017

(86) PCT No.: PCT/US2017/058259
§ 371 (c)(1),
(2) Date: Apr. 25, 2019

(87) PCT Pub. No.: WO2018/081249
PCT Pub. Date: May 3, 2018

(65) Prior Publication Data
US 2019/0277560 A1    Sep. 12, 2019

Related U.S. Application Data

(60) Provisional application No. 62/413,665, filed on Oct. 27, 2016.

(51) Int. Cl.
*F25D 31/00*    (2006.01)

(52) U.S. Cl.
CPC ........... *F25D 31/00* (2013.01); *F25D 31/007* (2013.01); *F25D 2331/805* (2013.01)

(58) Field of Classification Search
CPC .............. F25D 31/00; F25D 2331/805; F25D 2331/803; F25D 2317/043
See application file for complete search history.

(56) References Cited

U.S. PATENT DOCUMENTS

| | | | | |
|---|---|---|---|---|
| 5,440,896 A | * | 8/1995 | Maier-Laxhuber | F25B 17/08 62/269 |
| 5,482,541 A | * | 1/1996 | Maier-Laxhuber | F25B 35/04 96/117.5 |

(Continued)

FOREIGN PATENT DOCUMENTS

| | | |
|---|---|---|
| EP | 0543214 A1 | 5/1993 |
| EP | 0577869 A1 | 1/1994 |

(Continued)

OTHER PUBLICATIONS

Extended Search Report for EP 17864109.8, dated Jun. 4, 2020 (7 pp.).

(Continued)

*Primary Examiner* — Elizabeth J Martin
(74) *Attorney, Agent, or Firm* — Eversheds Sutherland (US) LLP

(57) ABSTRACT

A system may include a beverage compartment with a beverage positioned therein, a wetted material disposed about the beverage, at least one sorption cartridge, and a vacuum pump. The sorption cartridge may be in communication with the beverage compartment, and the vacuum pump may be in communication with the sorption cartridge to create a vacuum in the sorption cartridge and the beverage compartment, causing water to evaporate from the wetted material and be captured by the sorption cartridge, thereby lowering the temperature of the wetted material and in turn cooling the beverage. In some instances, the sorption cartridge may be detached from the vacuum pump and the beverage compartment to discharge the captured water (Continued)

therein by way of solar energy. In other instances, the sorption cartridge may be in communication with a heater assembly to blow heated air through the sorption cartridge to discharge the captured water therein.

10 Claims, 22 Drawing Sheets

(56) References Cited

U.S. PATENT DOCUMENTS

| | | | |
|---|---|---|---|
| 2005/0061022 | A1 | 3/2005 | Maier-Laxhuber et al. |
| 2011/0283735 | A1 | 11/2011 | Dawoud et al. |
| 2012/0073443 | A1* | 3/2012 | Hurley ............... B01D 53/0415 96/117.5 |
| 2013/0291574 | A1 | 11/2013 | Athalye |
| 2014/0290293 | A1 | 10/2014 | Eckhoff et al. |
| 2016/0348962 | A1* | 12/2016 | Roekens ................. F25D 19/00 |
| 2018/0128791 | A1* | 5/2018 | Knight ................... G01N 1/405 |

FOREIGN PATENT DOCUMENTS

| | | |
|---|---|---|
| FR | 802813 A | 9/1936 |
| JP | 07-004776 A | 1/1995 |

OTHER PUBLICATIONS

International Search Report and Written Opinion, PCT/US2017/058259, dated Feb. 7, 2018 (12 pp.).

\* cited by examiner

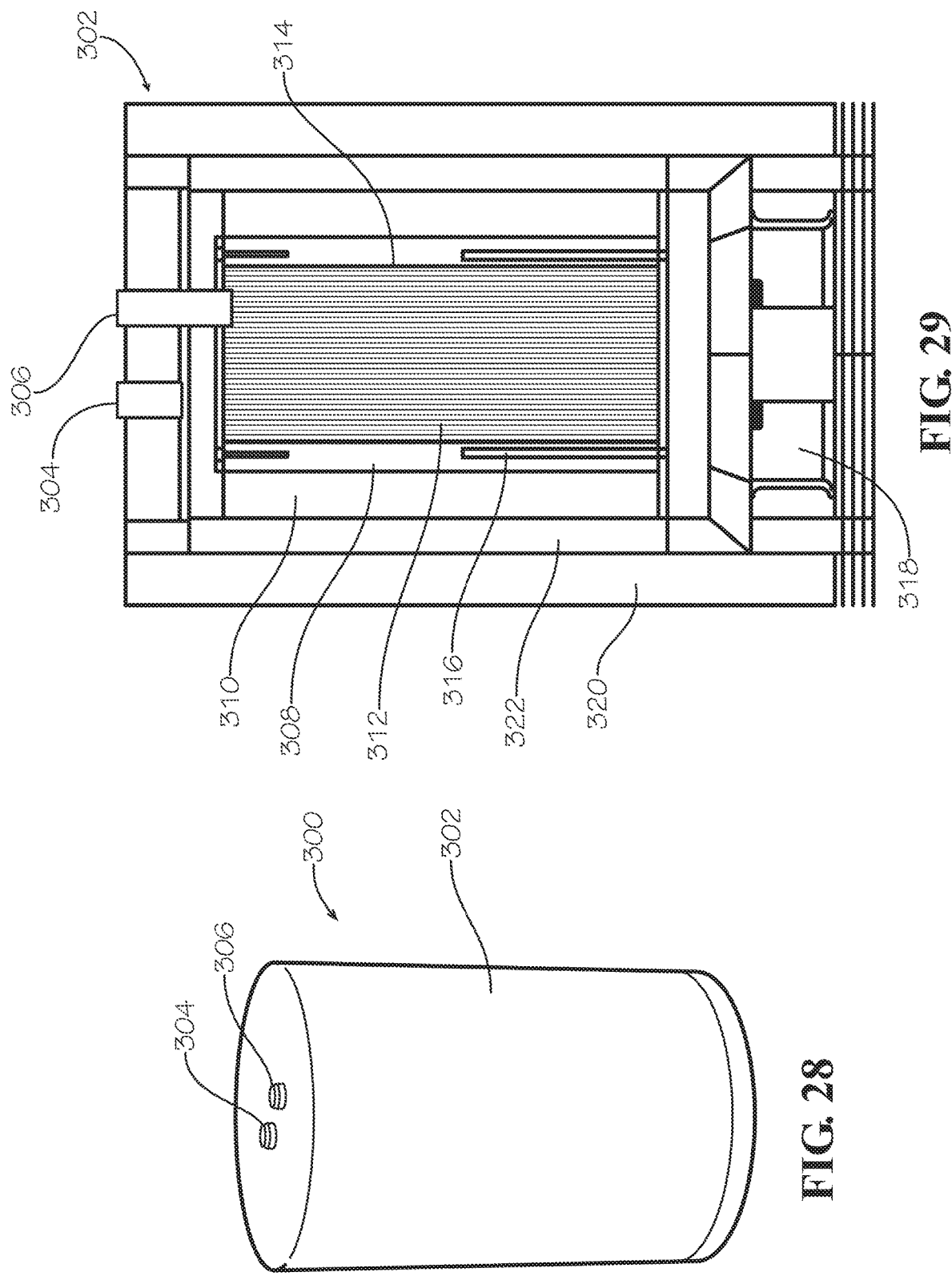

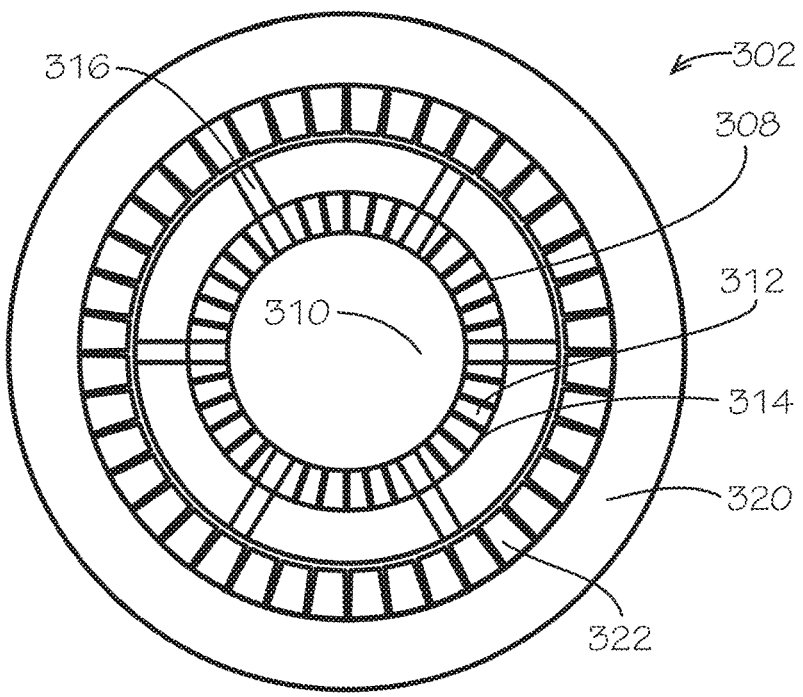
FIG. 30
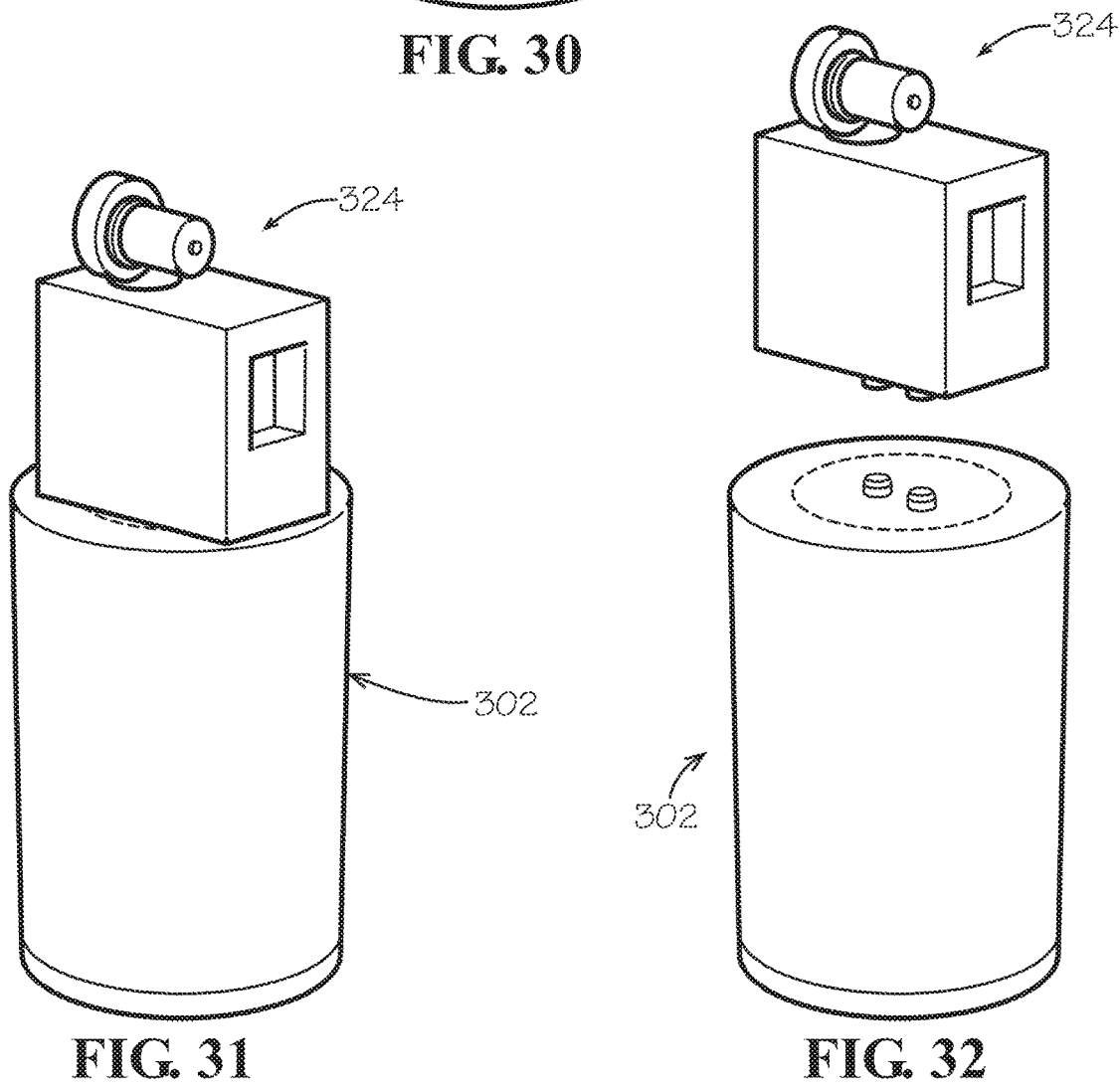
FIG. 31  FIG. 32

SYSTEMS AND METHODS FOR VACUUM COOLING A BEVERAGE

CROSS-REFERENCE TO RELATED APPLICATIONS

The disclosure claims priority to and the benefit of U.S. provisional patent application No. 62/413,665, filed Oct. 27, 2016, which is incorporated herein in its entirety.

FIELD OF THE DISCLOSURE

The disclosure generally relates to cooling a beverage and more particularly relates to systems and methods for vacuum cooling a beverage.

BACKGROUND

Current techniques for providing a cold beverage to a consumer may include filling a refrigerated cabinet with a number of beverages. This technique unnecessarily cools a number of beverages that may not be used for an extended period. As a result, a large amount of energy is used to cool and maintain beverages that may not be consumed in the short term. Accordingly, there is a need to provide on-demand cooling of beverages. Furthermore, certain parts of the world may not have access to constant or reliable electrical power. Indeed, many parts of the world have no access to electricity whatsoever. Therefore, there is a need to provide a cold beverage to consumers in certain parts of the world that may not have access to constant or reliable electrical power.

SUMMARY

Some or all of the above needs and/or problems may be addressed by certain embodiments of the disclosure. According to an embodiment, a system for cooling at least one beverage is disclosed. The system may include a beverage compartment with the beverage positioned therein, a wetted material disposed about the beverage, at least one sorption cartridge, and a vacuum pump. When in a first configuration, the sorption cartridge may be in fluid communication with the beverage compartment, and the vacuum pump may be in fluid communication with the sorption cartridge to create a vacuum in the sorption cartridge and the beverage compartment, causing water to evaporate from the wetted material and be captured by the sorption cartridge, thereby lowering the temperature of the wetted material and in turn cooling the beverage. In addition, when in a second configuration, the sorption cartridge may be detached from the vacuum pump and the beverage compartment to discharge the captured water therein by way of solar energy.

According to another embodiment, a system for cooling at least one beverage is disclosed. The system may include a beverage compartment with the beverage positioned therein, a wetted material disposed about the beverage, at least one sorption cartridge, a vacuum pump, and a heater assembly. When in a first configuration, the sorption cartridge may be in fluid communication with the beverage compartment, and the vacuum pump may be in fluid communication with the sorption cartridge to create a vacuum in the sorption cartridge and the beverage compartment, causing water to evaporate from the wetted material and be captured by the sorption cartridge, thereby lowering the temperature of the wetted material and in turn cooling the beverage. In addition, when in a second configuration, the sorption cartridge may be in fluid communication with the heater assembly to blow heated air through the sorption cartridge to discharge the captured water therein.

Other features and aspects of the disclosure will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 28 depicts a sorption cartridge according to an embodiment of the disclosure.

FIG. 29 depicts a cross-section of a sorption cartridge according to an embodiment of the disclosure.

FIG. 30 depicts a cross-section of a sorption cartridge according to an embodiment of the disclosure.

FIG. 31 depicts a sorption cartridge and a blower assembly according to an embodiment of the disclosure.

FIG. 32 depicts a sorption cartridge and a blower assembly according to an embodiment of the disclosure.

DETAILED DESCRIPTION

Figure 1:
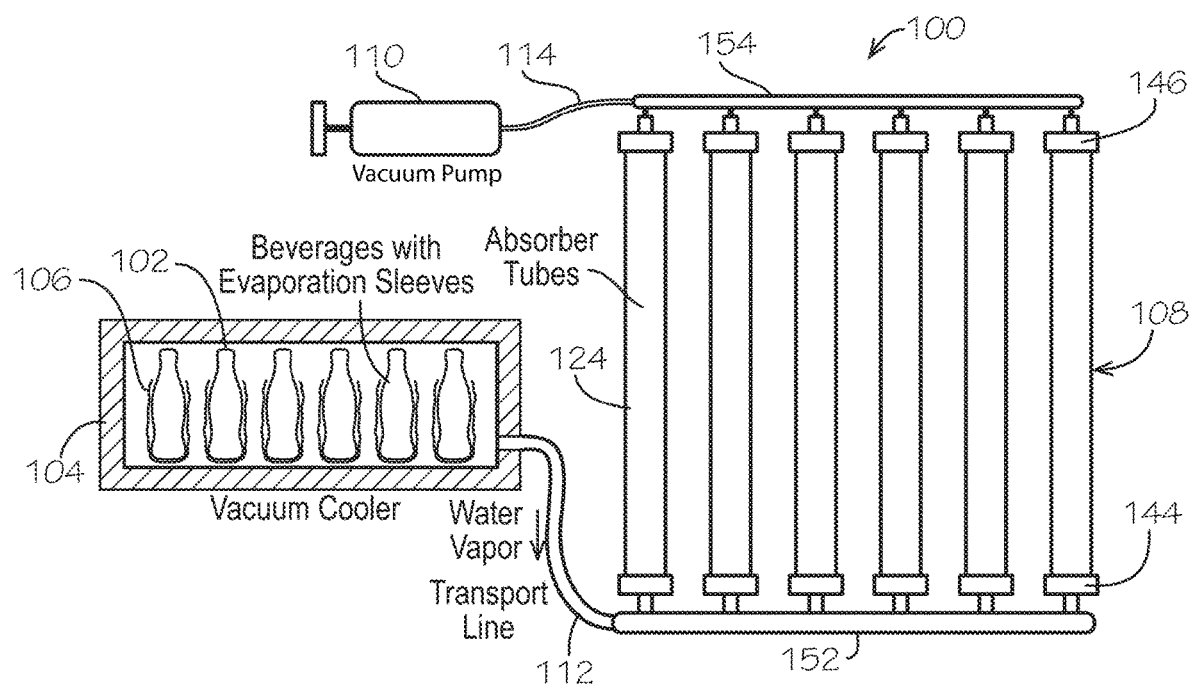
FIG. 1 depicts a system for cooling at least one beverage according to an embodiment of the disclosure.

Systems and methods for vacuum cooling a beverage are disclosed herein. In certain embodiments, the vacuum cooling assemblies disclosed herein may provide on-demand cooling of beverages or other products. That is, beverages or other products may be stored at ambient temperature and cooled as needed. In this manner, the vacuum cooling assemblies disclosed herein may eliminate the need for continuous refrigeration of beverages. In turn, the vacuum cooling assemblies disclosed herein may substantially reduce the amount of energy required to provide consumers with cool beverages. In addition, certain embodiments of the vacuum cooling assemblies may operate wholly or partially off-grid. That is, in some instances, the vacuum assemblies may be capable of operating in areas that do not have electrical power or do not have constant or reliable electrical power. Other technical effects and/or solutions may become apparent throughout the disclosure.

FIGS. 1-16 depict a system 100 (or portions thereof) for cooling at least one beverage 102. The system 100 may include a beverage compartment 104, a wetted material 106, at least one sorption cartridge 108, and a vacuum pump 110. In certain embodiments, the system 100 may include a first configuration, as depicted in FIGS. 1, 3, 6, 13, and 15, for cooling the beverage 102. In the first configuration, the beverage 102 may be positioned within the beverage compartment 104, and the wetted material 106 may be disposed about the beverage 102. In addition, when in the first configuration, the sorption cartridge 108 may be in fluid communication with the beverage compartment 104 via a conduit 112, and the vacuum pump 110 may be in fluid communication with the sorption cartridge 108 via a conduit 114. The vacuum pump 110 may be activated to create a vacuum in the sorption cartridge 108 and the beverage compartment 104, causing water to evaporate from the wetted material 106 and be captured within the sorption cartridge 108, thereby lowering the temperature of the wetted material 106 and in turn cooling the beverage 102. For off-grid operation, the vacuum pump 110 may be a hand-powered piston pump, a hand or pedal powered rotary pump, battery operated, or solar powered. For on-grid operation, the vacuum pump 110 may be any suitable electric pump.

Figure 2:
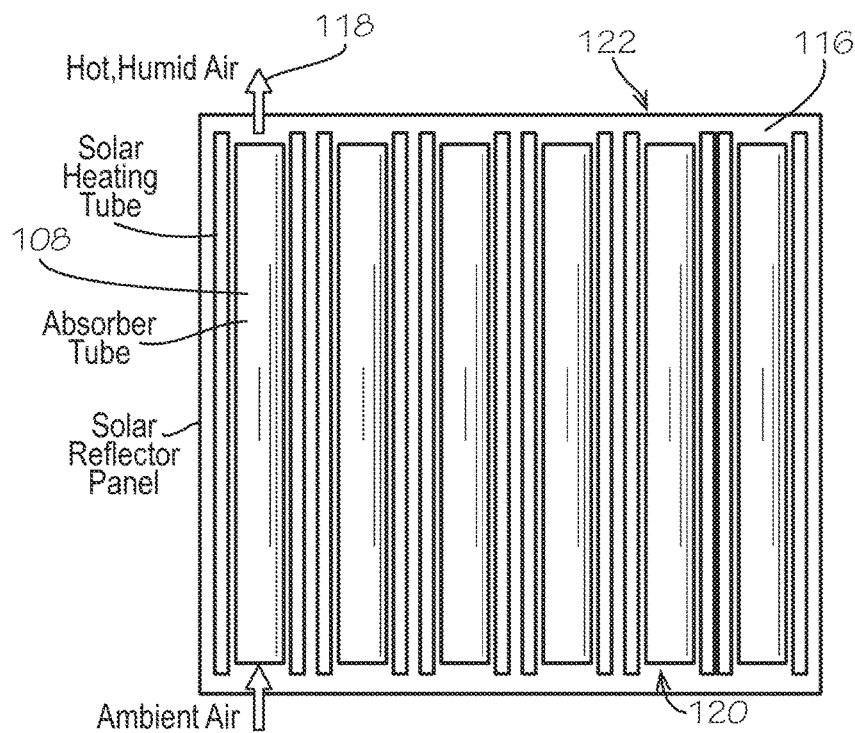
FIG. 2 depicts a number of sorption cartridges being regenerated according to an embodiment of the disclosure.
Figures 3, 4:
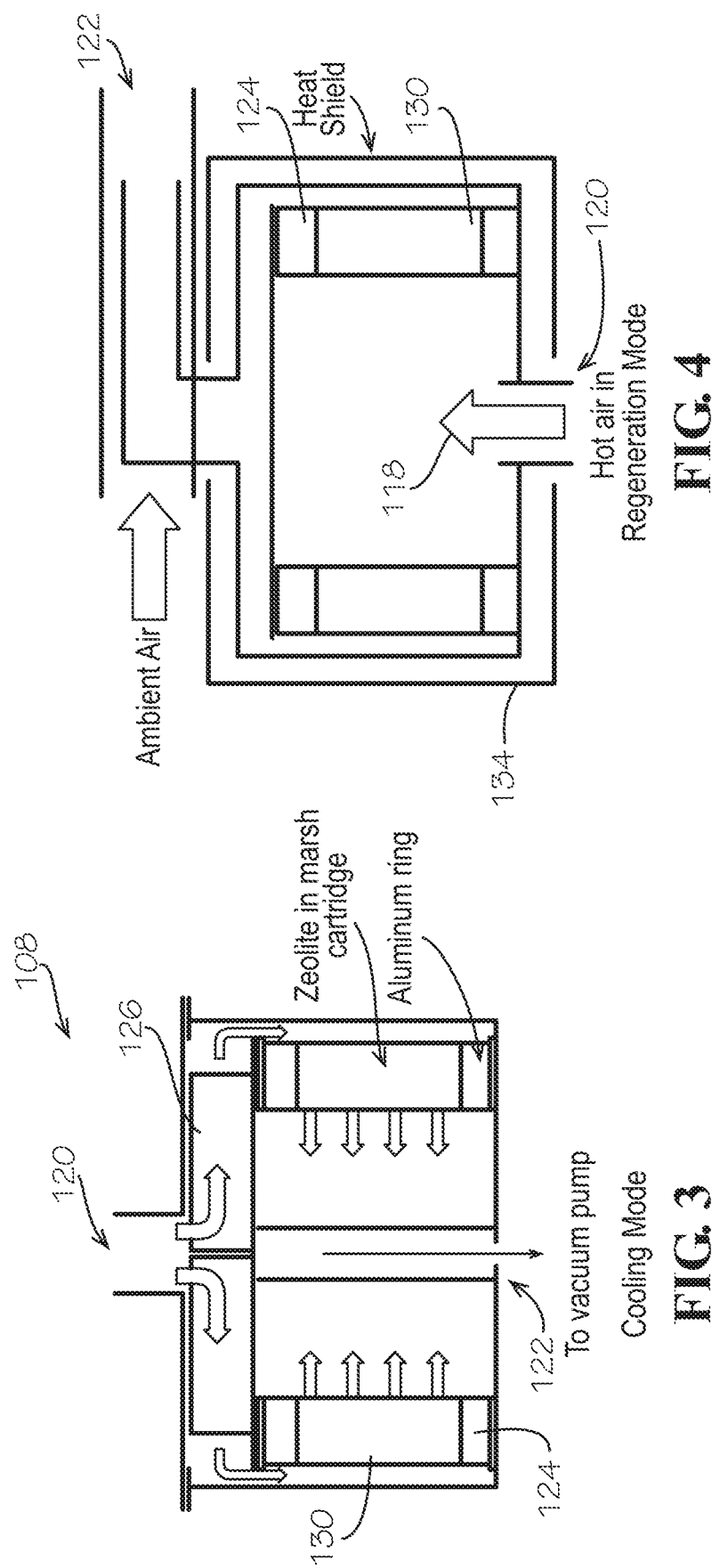
FIG. 3 depicts an sorption cartridge in a cooling mode according to an embodiment of the disclosure.
FIG. 4 depicts an sorption cartridge being regenerated according to an embodiment of the disclosure.
Figure 5:
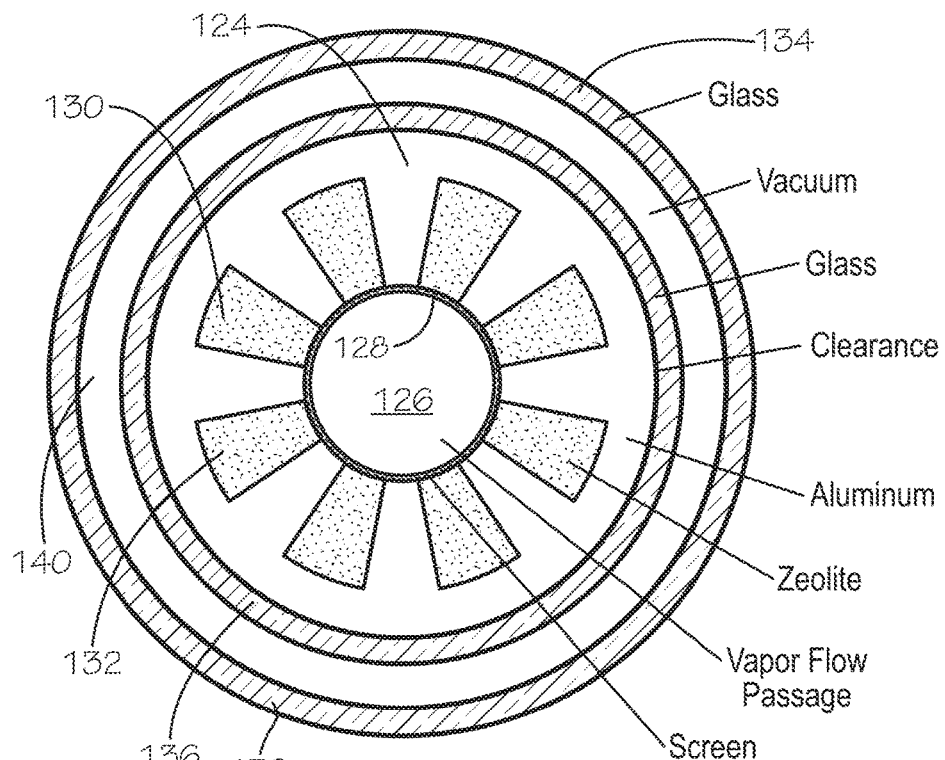
FIG. 5 depicts a cross-section of a sorption cartridge according to an embodiment of the disclosure.
Figure 6:
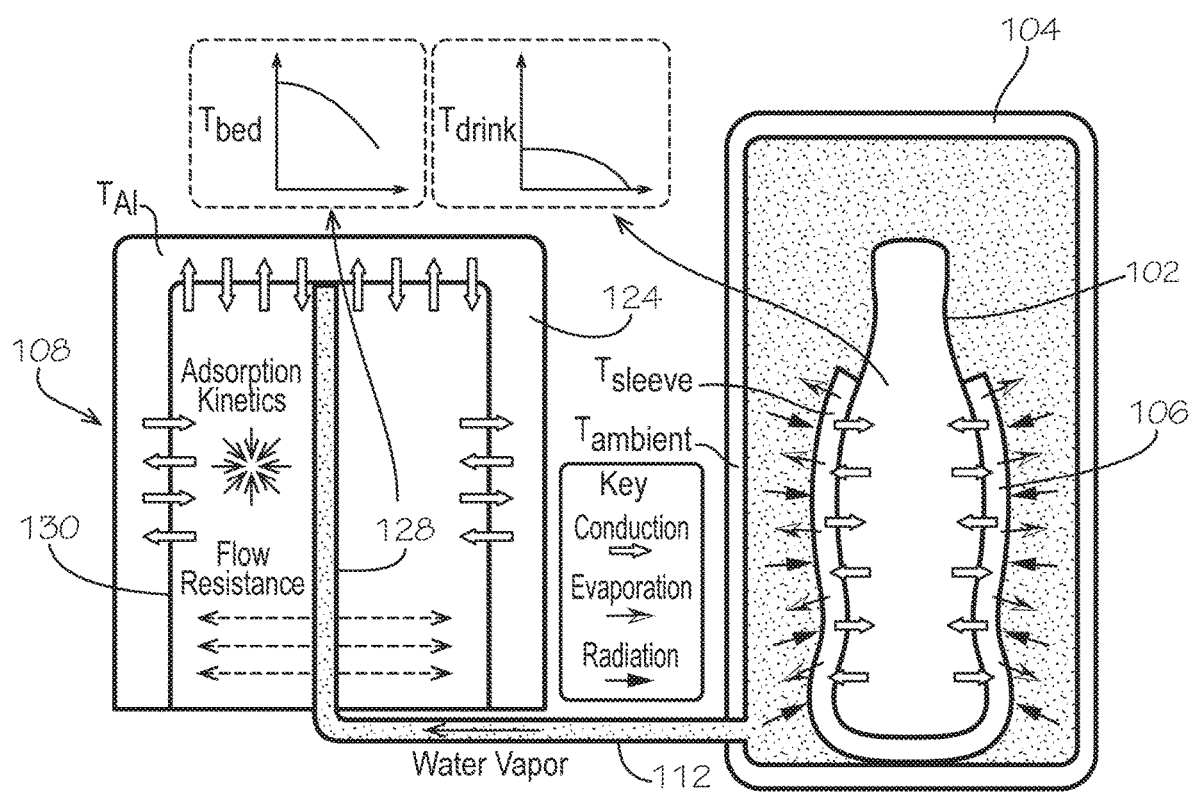
FIG. 6 depicts a system for cooling at least one beverage according to an embodiment of the disclosure.
Figure 7:
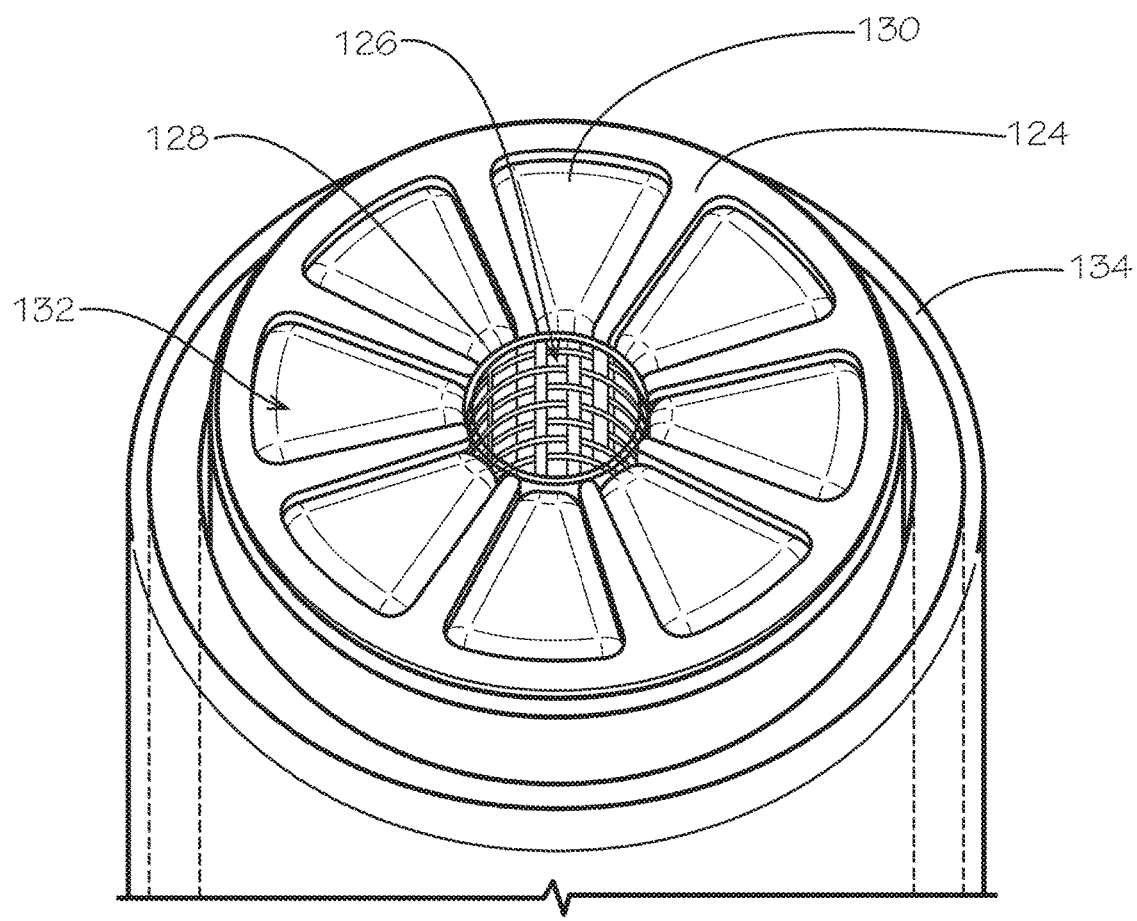
FIG. 7 depicts a perspective view of a sorption cartridge according to an embodiment of the disclosure.
Figure 8:
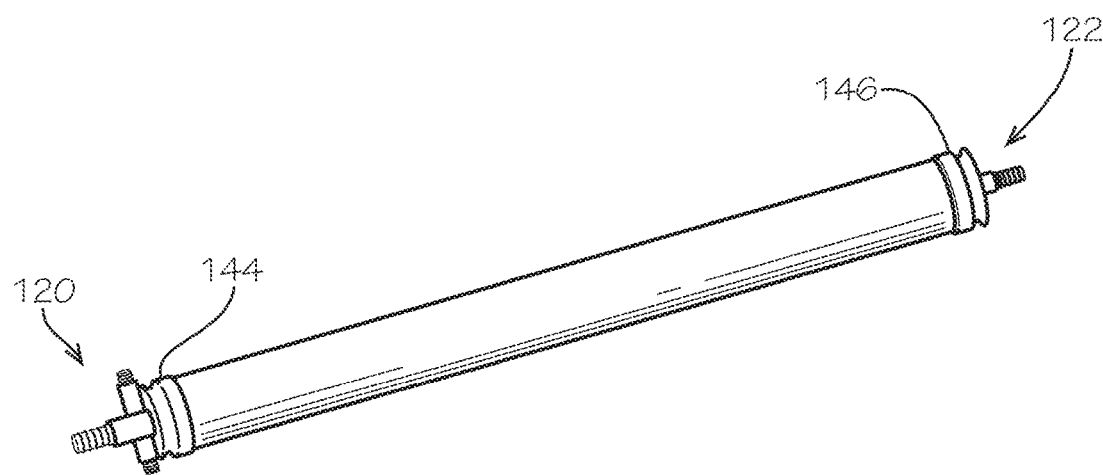
FIG. 8 depicts a perspective view of a sorption cartridge according to an embodiment of the disclosure.
Figure 10:
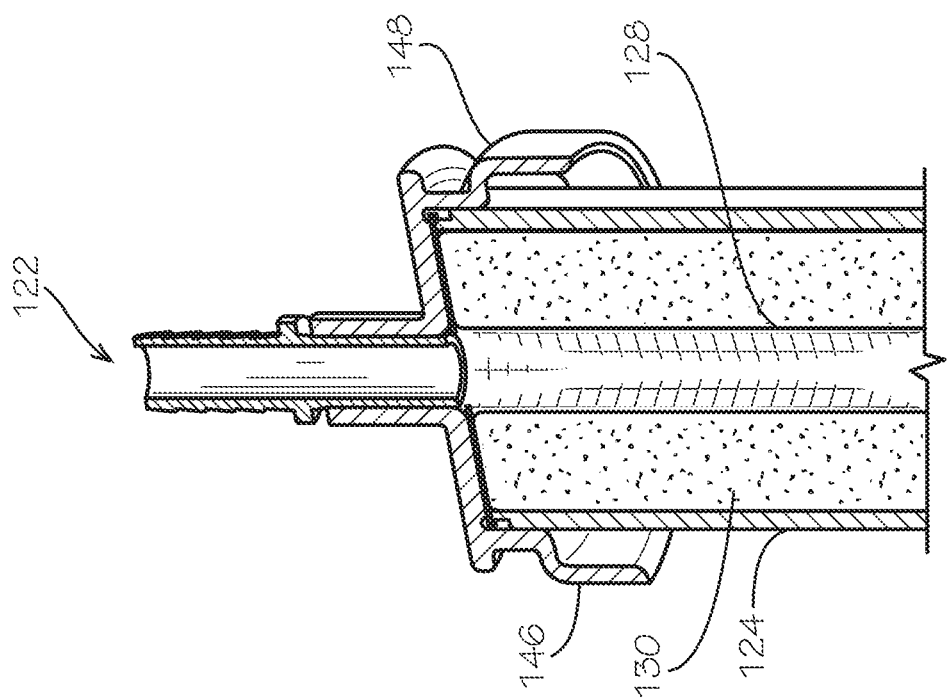
FIG. 10 depicts a sectional perspective view of a sorption cartridge according to an embodiment of the disclosure.
Figure 9:
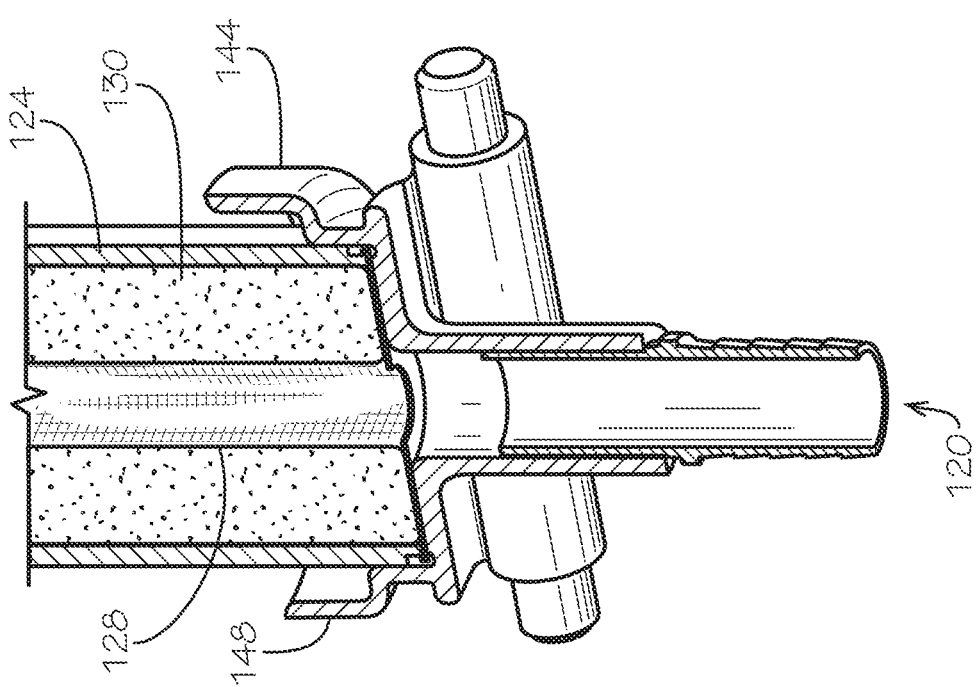
FIG. 9 depicts a sectional perspective view of a sorption cartridge according to an embodiment of the disclosure.
Figure 12:
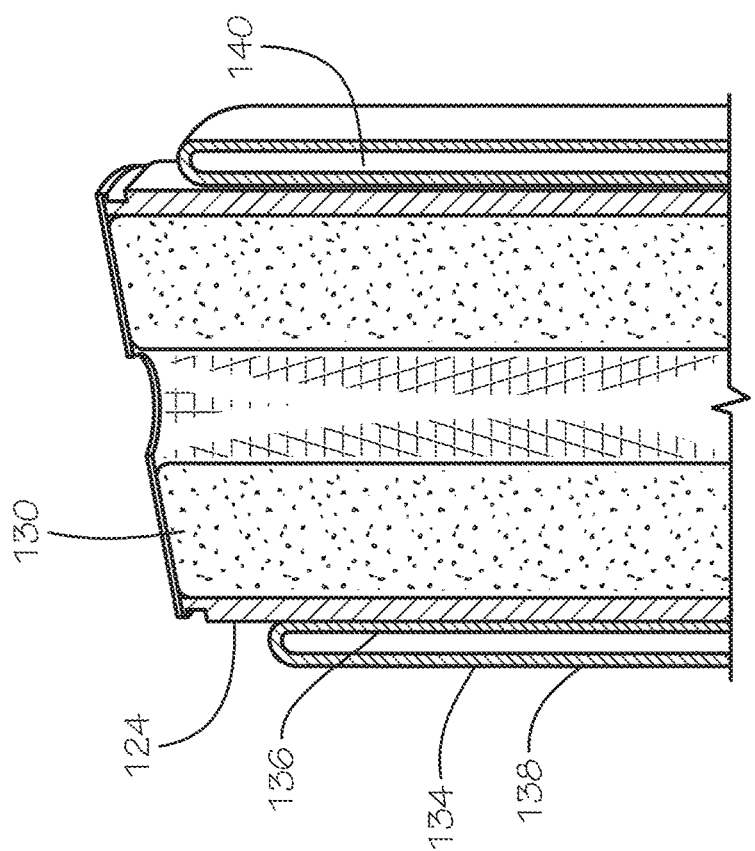
FIG. 12 depicts a sectional perspective view of a sorption cartridge according to an embodiment of the disclosure.
Figure 11:
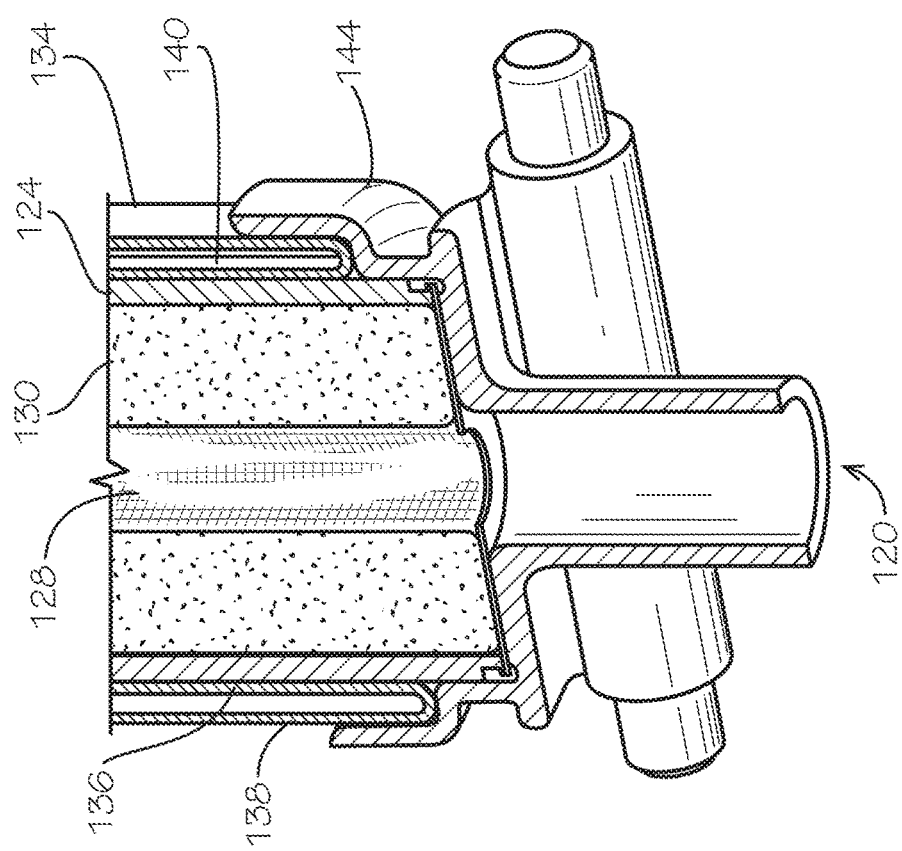
FIG. 11 depicts a sectional perspective view of a sorption cartridge according to an embodiment of the disclosure.

In addition, the system 100 may include a second configuration, as depicted in FIGS. 2, 4, 14 and 16, for regenerating the sorption cartridge 108. When in the second configuration, the sorption cartridge 108 may be detached from the vacuum pump 110 and the beverage compartment 104. In one embodiment of the second configuration, as depicted in FIG. 2, the sorption cartridge 108 may be placed in direct sunlight or within a solar reflector panel 116 to concentrate the solar energy. Other heat sources may be used, including heat lamps, ovens, fires, etc. A flow of air 118 may pass through the sorption cartridge 108. The air flow 118 may be caused by natural convection, but it can also be forced with an electric fan, which may be solar powered. In some instances, the flow of air 118 may be heated by the solar energy. The flow of air 118 may absorb and transfer the water vapor within the sorption cartridge 108 to the ambient environment. The water vapor may be discharged from the sorption cartridge 108 as the flow of air 118 exits the sorption cartridge 108. Removal of the water vapor from the sorption cartridge 108 may regenerate the sorption cartridge 108 and enable the sorption cartridge 108 to be reused in the first configuration for cooling the beverage 102. The cycle between the first and second configurations may be repeated over and over to cool the beverage 102 and regenerate the sorption cartridge 108.

Any number of beverages 102 may be cooled by the system 100. That is, a single beverage 102 may be cooled, or a number of beverages 102 may be cooled at the same time. The beverages 102 may comprise bottles, cans, or other types of ready-to-drink (RTD) beverages. Although described as bottles or cans, any object capable of holding and transporting a beverage may be used. That is, the beverages 102 may be disposed in any closed containers or the like. Products other than beverages may also be used herein.

In some instances, the beverage compartment 104 may be a vacuum chamber. The beverage compartment 104 may be any suitable size, shape, or configuration. The beverage compartment 104 may accommodate a single or multiple beverages 102. For example, a crate, which may hold a number of beverages 102, may be disposed within the beverage compartment 104. The beverage compartment 104 may accommodate any product. The beverage compartment 104 may include an access door. The access door may be opened and closed for inserting and removing the beverages 102. A seal may form a hermetic seal about the access door when the access door is closed to ensure that the beverage compartment 104 is capable of forming a vacuum therein.

In certain embodiments, the wetted material 106 may include a cloth, foam, sponge, or the like soaked in water. In some instances, the wetted material 106 may form a sleeve about each of the beverages 102. Any suitable material may be used herein. The wetted material 106 may be dampened, soaked, saturated, etc., with water and then placed about the beverages 102. Each beverage 102 may include a corresponding sleeve of wetted material 106, or a single wetted material 106 may be disposed about a number of beverages 102.

In certain embodiments, the sorption cartridge 108 may include an inlet 120, an outlet 122, a support structure 124, a passage 126 within the support structure 124, a screen 128 or perforated plate disposed around the passage 126, and a sorbent material 130 disposed between the screen 128 and the support structure 124. In some instances, the support structure 124 may comprise an elongated tubular structure that includes one or more internal chambers 132. In one embodiment, the support structure 124 may be aluminum. During the cooling cycle, the aluminum may act as a heatsink. The preferred weight ratio of aluminum/sorbent material is approximately 1:1. The support structure 124 may be any suitable material. The screen 128 may be disposed around the passage 126 within the support structure 124. The screen 128 may contain the sorbent material 130 within the internal chambers 132. That is, the sorbent material 130 may be disposed within the internal chambers 132 formed between the screen 128 and the support structure 124. In some instances, the sorbent material 130 may be zeolite. Any suitable sorbent material 130 may be used. The sorption cartridge 108 may be any size, shape, or configuration.

In addition, the sorption cartridge 108 may include an outer shell 134. In some instances, the outer shell 134 may be substantially transparent. In addition, the outer shell 134 may comprise a vacuum insulated outer shell. The outer shell 134 may be disposed about the support structure 124. In some instances, the outer shell 134 may be removable from the support structure 124. That is, the outer shell 134 may be slid on and off of the support structure 124. In this manner, the outer shell 134 may be generally tubular in shape and include an internal bore that is configured to mate with the support structure 124. In some instances, the outer shell 134 may be omitted in the first configuration and then slid onto the support structure 124 in the second configuration. That is, the outer shell 134 may be used when regenerating the sorption cartridge 108 but not used when cooling the beverage 102. In some instances, the outer shell 134 may include an inner wall 136 and an outer wall 138 with closed ends. In this manner, the outer shell 134 may include an internal chamber 140. In some instances, the internal chamber 140 may be a vacuum chamber. That is, the internal chamber 140 may be under vacuum.

In the first configuration, the inlet 120 may be in fluid communication with the beverage compartment 104 via the conduit 112 (such as a hose or the like), and the outlet 122 may be in fluid communication with the vacuum pump 110 via the conduit 114 (such as a hose or the like). As discussed below, the conduits 112, 114 may be in fluid communication with manifolds 152, 154 for accommodating a number of sorption cartridges 108. When the vacuum pump 110 is activated, the sorption cartridge 108 and the beverage compartment 104 may be placed under vacuum. As a result, water may evaporate from the wetted material 106 and pass through the conduit 112 into the sorption cartridge 108 via the inlet 120. The water vapor may flow along the passage 126, through the screen 128, and be captured by the sorbent material 130. As the water evaporates from the wetted material 106, the temperature of the wetted material 106 may be lowered, which in turn may cool the beverage 102. In some instances, a sun shield 142 may be used in the first configuration to block sunlight from warming the sorption cartridge 108 during the cooling process.

Valves may be incorporated into the system 100 to maintain the appropriate pressure in the beverage compartment 104. For example, the valves may maintain the pressure to prevent freezing of the wetted material 106 around the beverage 102. In some instances, a vacuum valve may be disposed along the conduit 114. In addition, an air pressure valve may be attached to the beverage compartment 104. For example, WO 2015/116903, which is incorporated by reference herein in its entirety, includes a vacuum valve 514 and an air inlet valve 520, which could be included in the system 100 of the present application to control the pressure within the beverage compartment 104. Other valve configurations may be used.

After chilling the beverage 102, the sorbent material 130 may be saturated with water. In order to remove the water from the sorbent material 130, the system 100 may be arranged in the second configuration. In the second configuration, the inlet 120 may be detached from the conduit 112 so that it is no longer in communication with the beverage compartment 104. Likewise, the outlet 122 may be detached from the conduit 114 so that it is no longer in communication with the vacuum pump 110. Once detached, the sorption cartridge 108 may be placed in direct sunlight or within a solar reflector panel. Other sources of heat may be used. Sunlight may pass through the outer shell 134 and heat the sorbent material 130 within the support structure 124. In some instances, the sunlight may heat a coating on the inner wall 136, which then heats the support structure 124. The flow of air 118 may pass through the passage 126 from the inlet 120 to the outlet 122. The flow of air 118 may be heated through contact with the hot support structure 124 and sorbent material 130. The sorbent material 130 may expel water vapor as it is heated by the sun. The flow of air 118 may absorb this water vapor and transfer the water vapor to the ambient environment. For example, the flow of air 118 may absorb the water vapor by way of convection inside passage 126. The water vapor may be discharged from the sorption cartridge 108 as the flow of heated air 118 exits the outlet 122. Removal of the water vapor from the sorption cartridge 108 may dry (i.e., regenerate) the sorbent material 130 and enable the sorption cartridge 108 to be reused in the first configuration for cooling the beverage 102. The cycle between the first and second configurations may be repeated over and over to cool the beverage 102 and regenerate the sorption cartridge 108.

In some instances, the sorption cartridge 108 may include an inlet end cap 144 at the inlet 120 and an outlet end cap 146 at the outlet 122. The inlet end cap 144 and the outlet end cap 146 may provide connecting points for connecting the sorption cartridge 108 to the beverage compartment 104 and vacuum pump 110, respectively, via the conduits and/or manifolds. In this manner, the inlet end cap 144 and the outlet end cap 146 may include various valves and/or connection points. In addition, the inlet end cap 144 and the outlet end cap 146 may include a lip 148 that controls the position of the outer shell 134 about the support structure 124. The inlet end cap 144 and the outlet end cap 146 may be any size, shape, or configuration.

In some instances, as depicted in FIGS. 13-16, the inlet 120 and the outlet 122 may be disposed at the same end of the sorption cartridge 108. In such instances, when in the second configuration, a blower 150 may be attached to the inlet 120 to force the flow of air 118 through the passage 126 in order to remove the water vapor from the sorbent material 130. For off-grid operation, the blower 150 may be hand powered, battery powered, or solar powered. In other instances, as depicted in FIGS. 1, 2, and 8-12, the inlet 120 and the outlet 122 may be disposed at opposite ends of the sorption cartridge 108. In such instances, in the second configuration, the sorption cartridge 108 may be positioned vertically to facilitate the flow of air 118 therethrough via natural convection.

In the first configuration, the inlet end cap 144 may be attached to the beverage chamber 104 via the conduit 112 or the like, and the outlet end cap 146 may be attached to the vacuum pump 110 via the conduit 114 or the like. The inlet end cap 144, the outlet end cap 146, or both may be removable. Once removed, when in the second configuration, the flow of air 118 may flow through the passage 126 via natural convection or the flow of air 118 may be force through the passage 126 via the blower 150. When the inlet 120 and the outlet 122 are disposed on the same side of the sorption cartridge 108, the inlet end cap 144 and the outlet end cap 146 may be consolidated into a single end cap 156 disposed on one end of the sorption cartridge 108.

Figure 13:
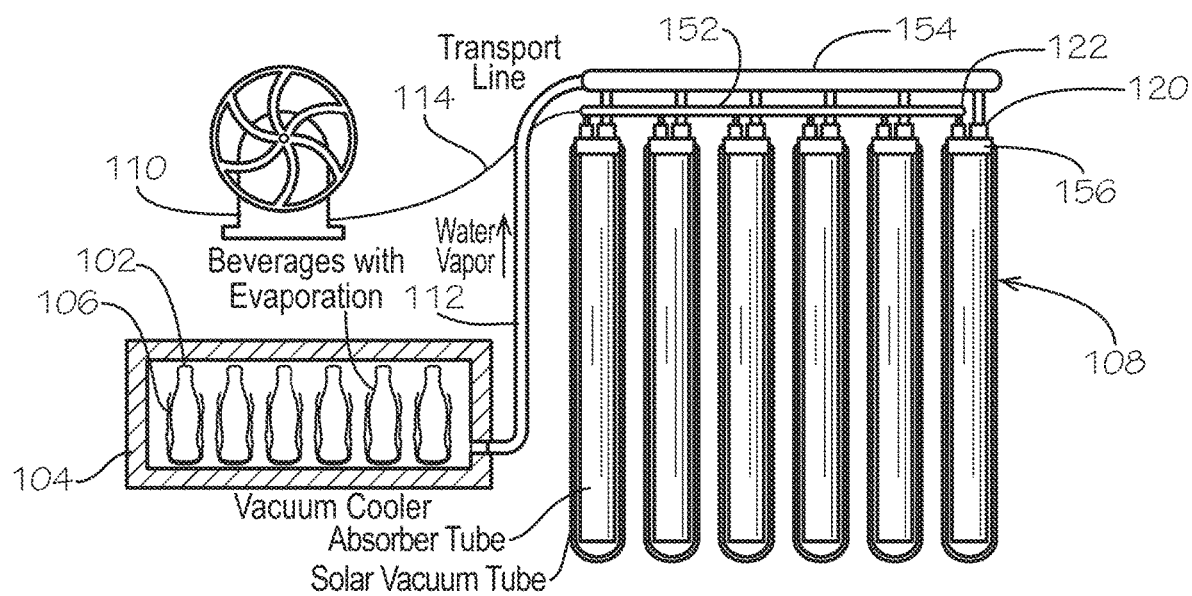
FIG. 13 depicts a system for cooling at least one beverage according to an embodiment of the disclosure.
Figure 14:
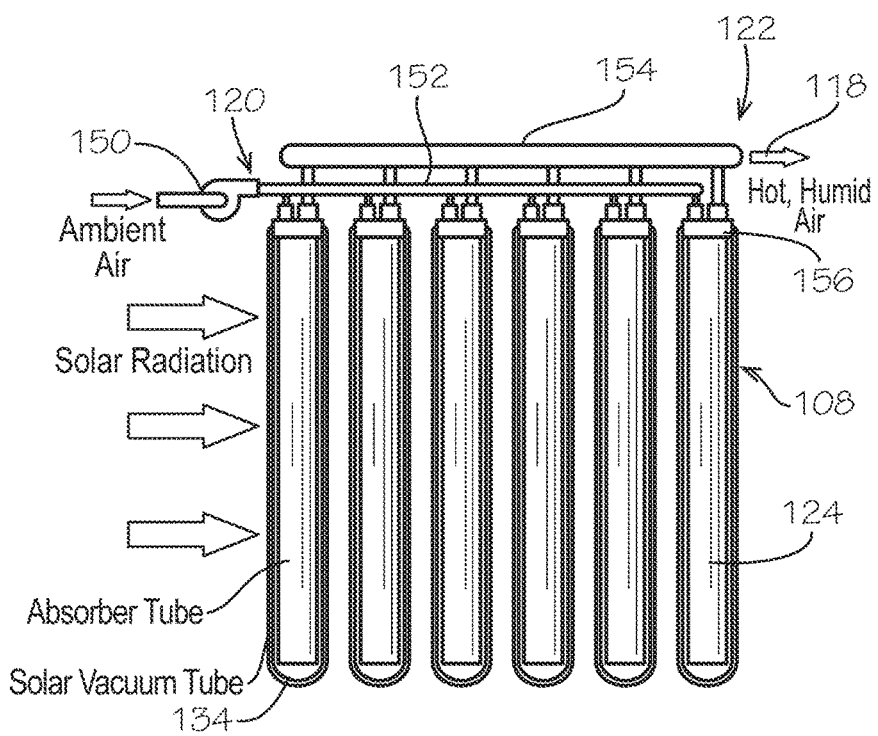
FIG. 14 depicts a system for regenerating one or more sorption cartridges according to an embodiment of the disclosure.
Figure 16:
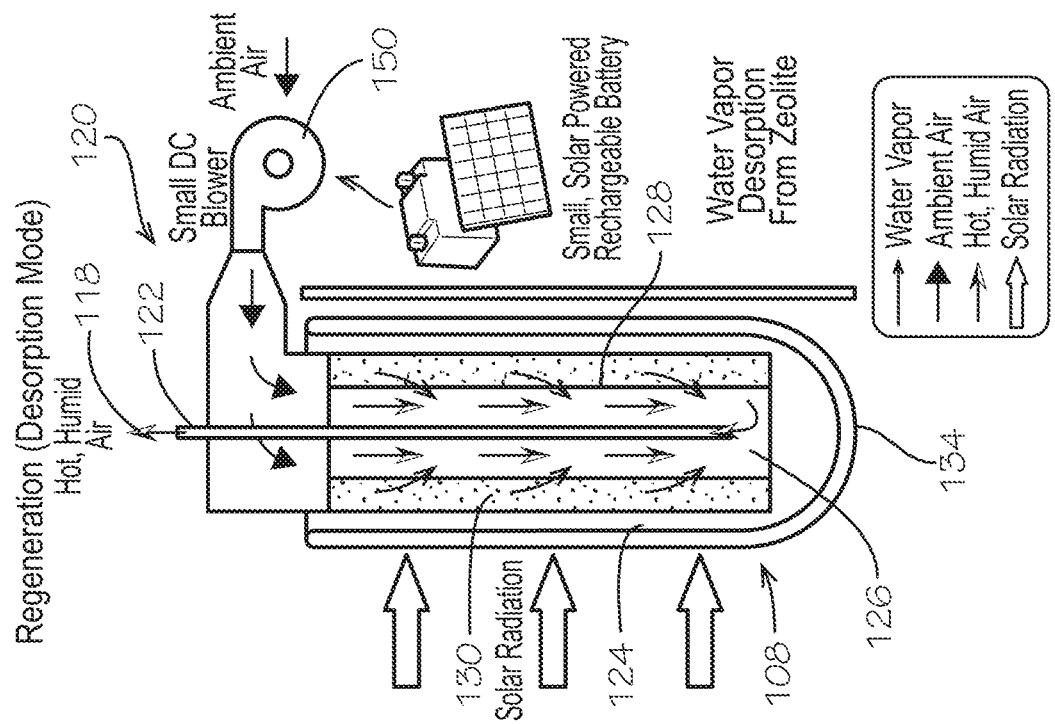
FIG. 16 depicts a sorption cartridge being regenerated according to an embodiment of the disclosure.
Figure 15:
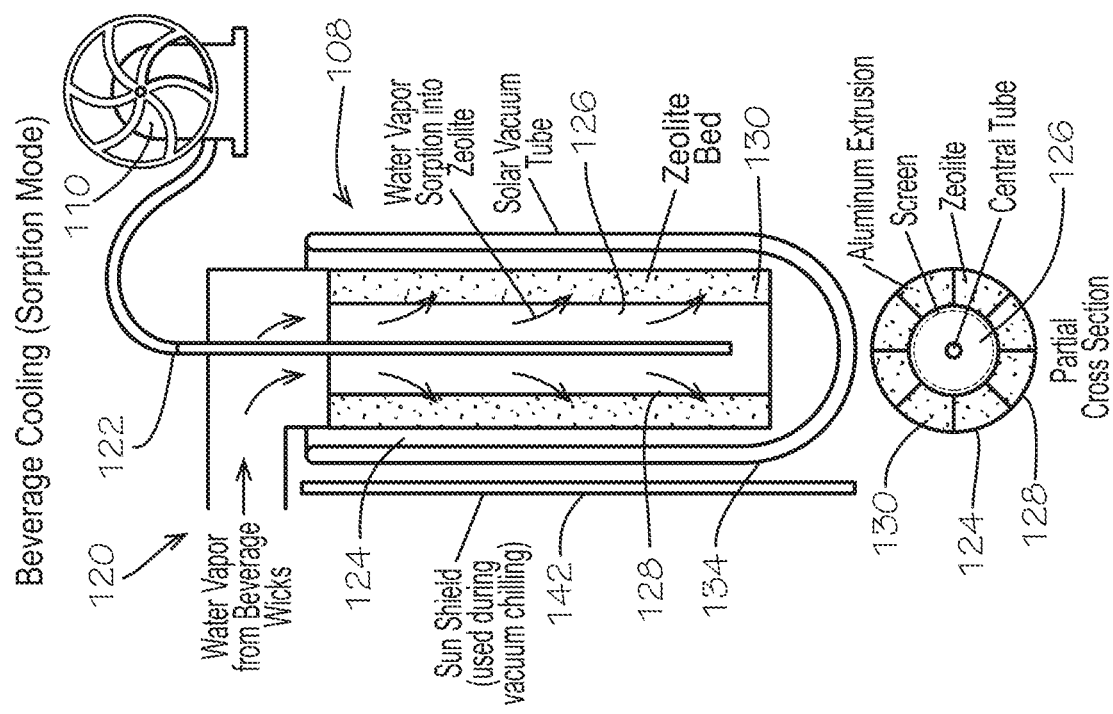
FIG. 15 depicts a sorption cartridge in a cooling mode according to an embodiment of the disclosure.

In some instances, a number of sorption cartridges 108 may be used. For example, as depicted in FIGS. 1, 13, and 14, the system 100 may include a vapor manifold 152 disposed in fluid communication between the beverage compartment 104 and the sorption cartridges 108. The conduit 112 may connect the vapor manifold 152 to the beverage compartment 104. In some instances, as depicted in FIG. 2, when in the second configuration, the sorption cartridges 108 may be disconnected from the vapor manifold 152. In other instances, as depicted in FIG. 14, the sorption cartridges 108 may not be disconnected from the vapor manifold 152 when in the second configuration.

The system 100 also may include a vacuum manifold 154 disposed in fluid communication between the vacuum pump 110 and the sorption cartridges 108. The conduit 114 may connect the vacuum manifold 154 to the vacuum pump 110. In some instances, as depicted in FIG. 2, when in the second configuration, the sorption cartridges 108 may be disconnected from the vacuum manifold 154. In other instances, as depicted in FIG. 14, the sorption cartridges 108 may not be disconnected from the vacuum manifold 154 when in the second configuration.

In use, in order to provide a chilled beverage to a consumer, the beverage 102 may be positioned within the beverage compartment 104, and the wetted material 106 may be disposed about the beverage 102. The vacuum pump 110 may be activated to create a vacuum in the sorption cartridge 108 and the beverage compartment 104, causing water to evaporate from the wetted material 106 and be captured within the sorption cartridge 108, thereby lowering the temperature of the wetted material 106 and in turn cooling the beverage 102. In order to reuse the sorption cartridge 108, it may be dried (i.e., regenerated). To do so, the sorption cartridge 108 may be detached from the vacuum pump 110 and the beverage compartment 104 and placed in direct sunlight or within a solar reflector panel 116 to concentrate the solar energy. Air 118 may flow through the passage 126 via natural convection or air 118 may be force through the passage 126 via the blower 150. The flow of air 118 may absorb and transfer the water vapor within the sorption cartridge 108 to the ambient environment. Removal of the water vapor from the sorption cartridge 108 may regenerate the sorption cartridge 108 and enable the sorption cartridge 108 to be reused in the first configuration for cooling the beverage 102.

FIGS. 17-27 depict a system 200 (or portions thereof) for cooling at least one beverage 202. The system 200 may include a beverage compartment 204, a wetted material 206, at least one sorption cartridge 208, a vacuum pump 210, and a heater assembly 212. The beverage 202, beverage compartment 204, wetted material 206, vacuum pump 210, and, in some instances, the sorption cartridge 208 may be similar to those described above with reference to FIGS. 1-16.

Figure 17:
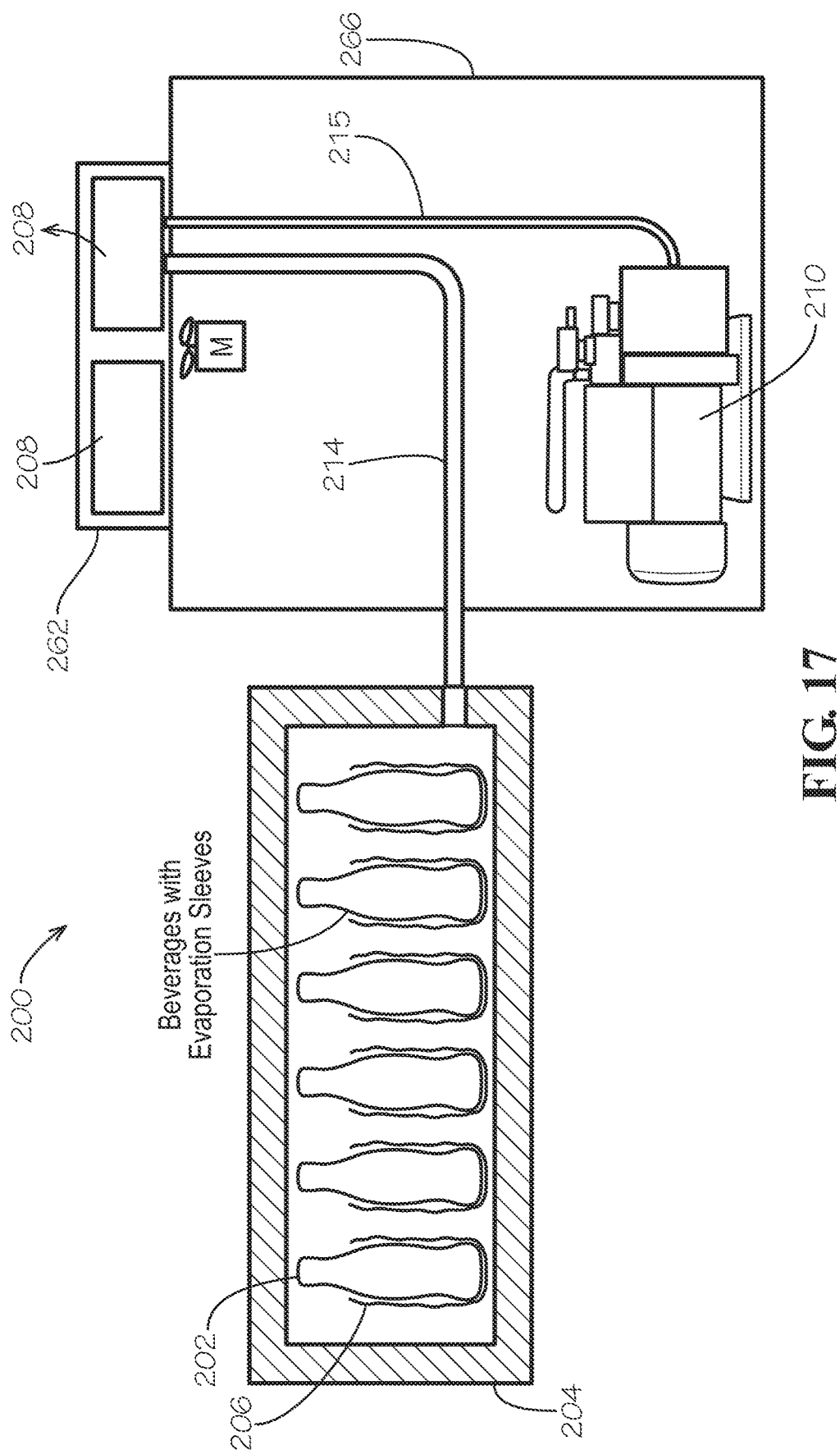
FIG. 17 depicts a system for cooling at least one beverage according to an embodiment of the disclosure.

In certain embodiments, as depicted in FIG. 17, the system 200 may include a first configuration for cooling the beverage 202. In the first configuration, the beverage 202 may be positioned within the beverage compartment 204, and the wetted material 206 may be disposed about the beverage 202. In addition, when in the first configuration, the sorption cartridge 208 may be in fluid communication with the beverage compartment 204 via a conduit 214, and the vacuum pump 210 may be in fluid communication with the sorption cartridge 208 via a conduit 215. The vacuum pump 210 may be activated to create a vacuum in the sorption cartridge 208 and the beverage compartment 204, causing water to evaporate from the wetted material 206 and be captured within the sorption cartridge 208, thereby lowering the temperature of the wetted material 206 and in turn cooling the beverage 202.

Figure 18:
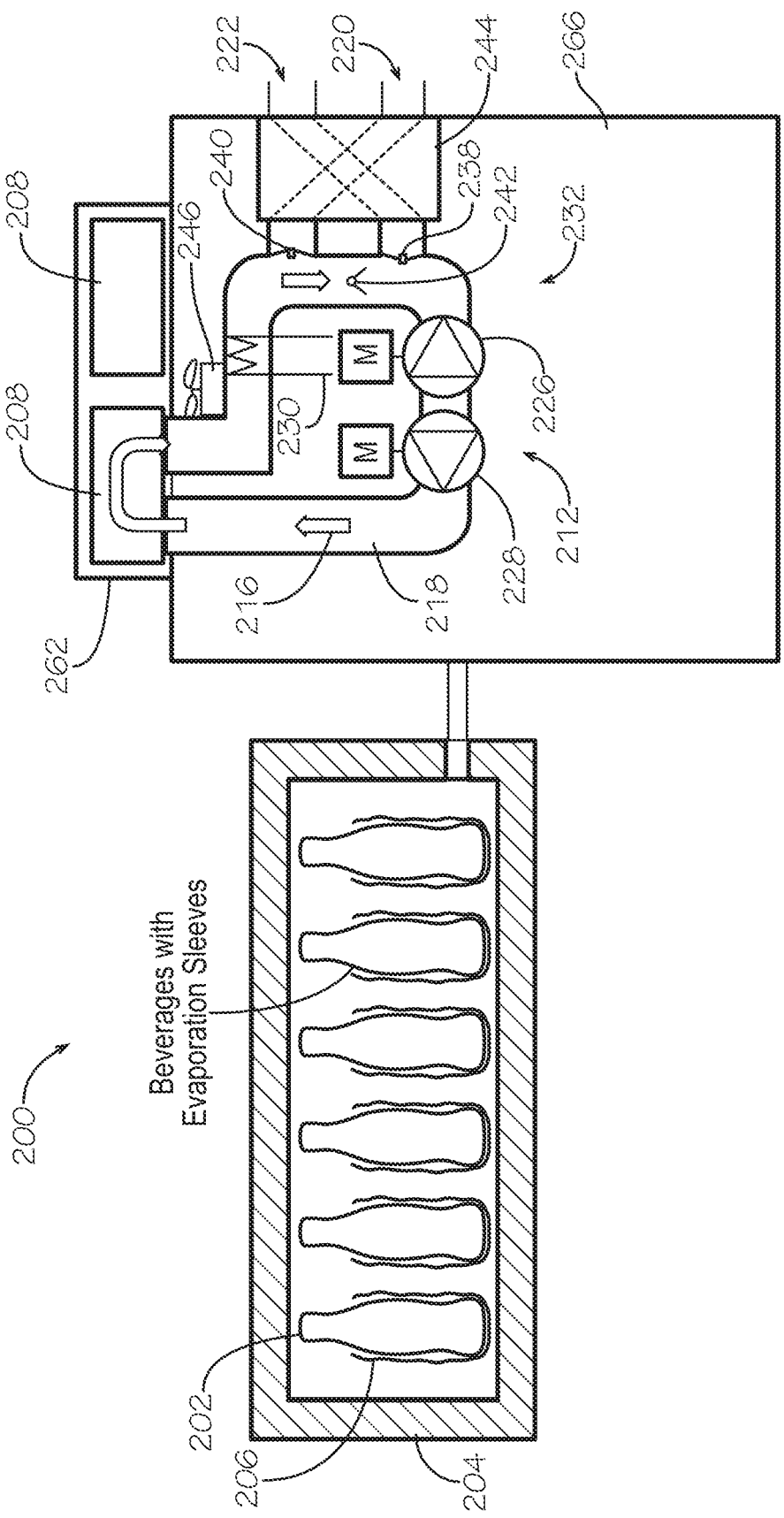
FIG. 18 depicts a system for heating a sorption cartridge according to an embodiment of the disclosure.
Figure 19:
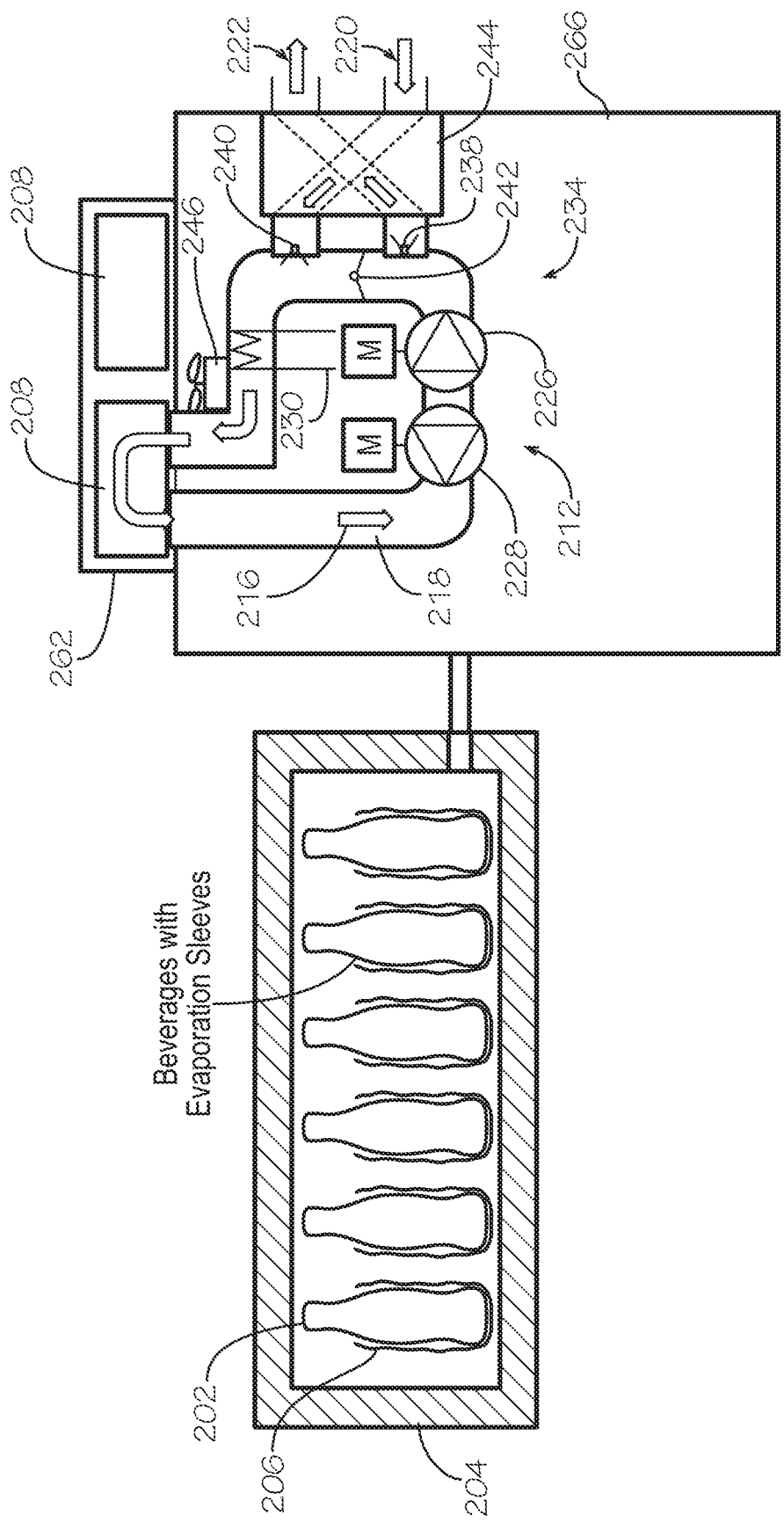
FIG. 19 depicts a system for regenerating a sorption cartridge according to an embodiment of the disclosure.
Figure 20:
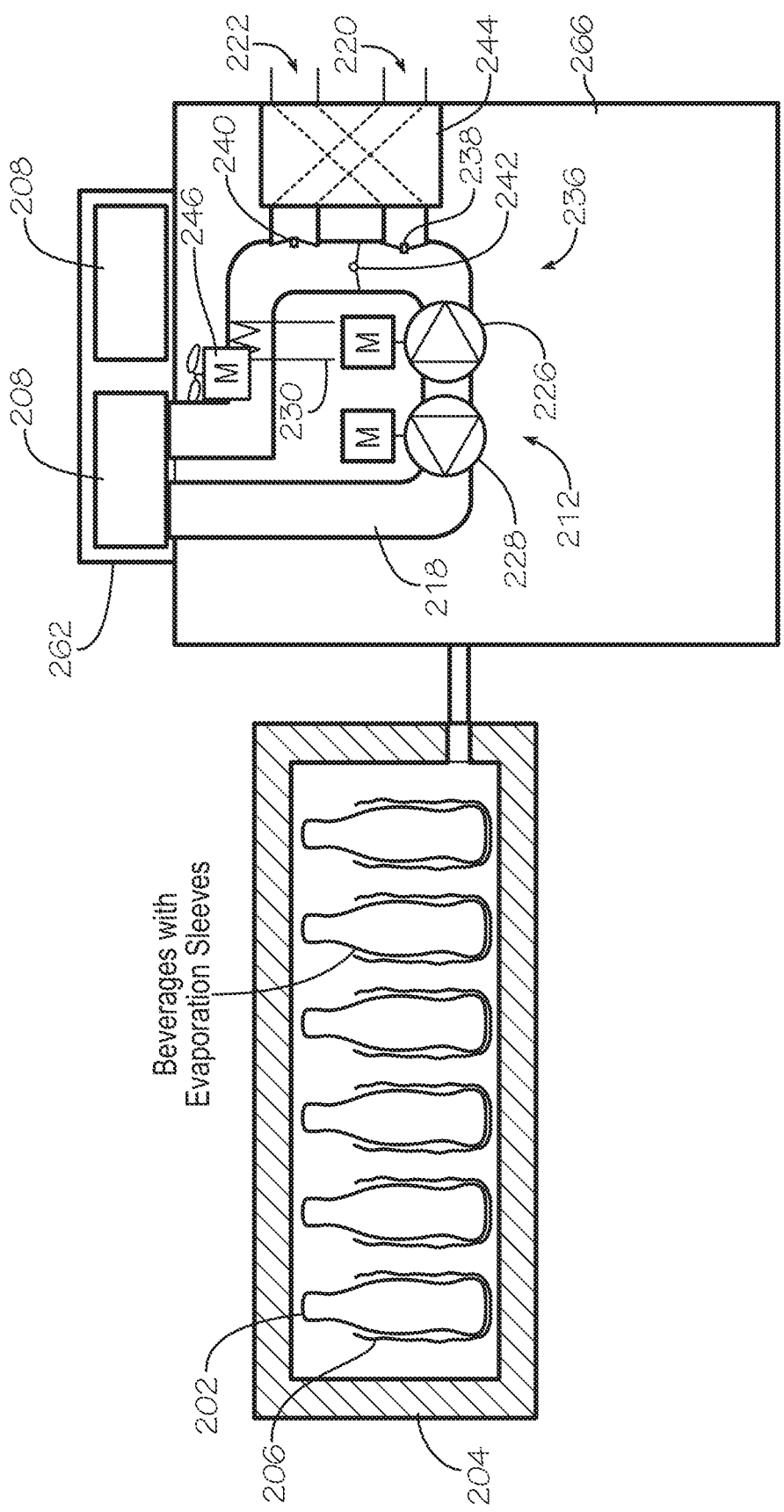
FIG. 20 depicts a system for cooling a sorption cartridge according to an embodiment of the disclosure.

In addition, as depicted in FIGS. 18-20, the system 200 may include a second configuration for regenerating the sorption cartridge 208. When in the second configuration, the sorption cartridge 208 may be detached from the vacuum pump 210 and the beverage compartment 204. Once detached, the sorption cartridge 208 may be configured in fluid communication with the heater assembly 212. The heater assembly 212 may blow a flow of heated air 216 through the sorption cartridge 208 to remove the captured water within the sorption cartridge 208. The flow of air 216 may absorb and transfer the water vapor within the sorption cartridge 208 to the ambient environment. The water vapor may be discharged from the sorption cartridge 208 as the flow of air 216 exits the sorption cartridge 208 and the heater assembly 212. Removal of the water vapor from the sorption cartridge 208 may regenerate the sorption cartridge 208 and enable the sorption cartridge 208 to be reused in the first configuration for cooling the beverage 202. The cycle between the first and second configurations may be repeated over and over to cool the beverage 202 and regenerate the sorption cartridge 208.

Figure 21:
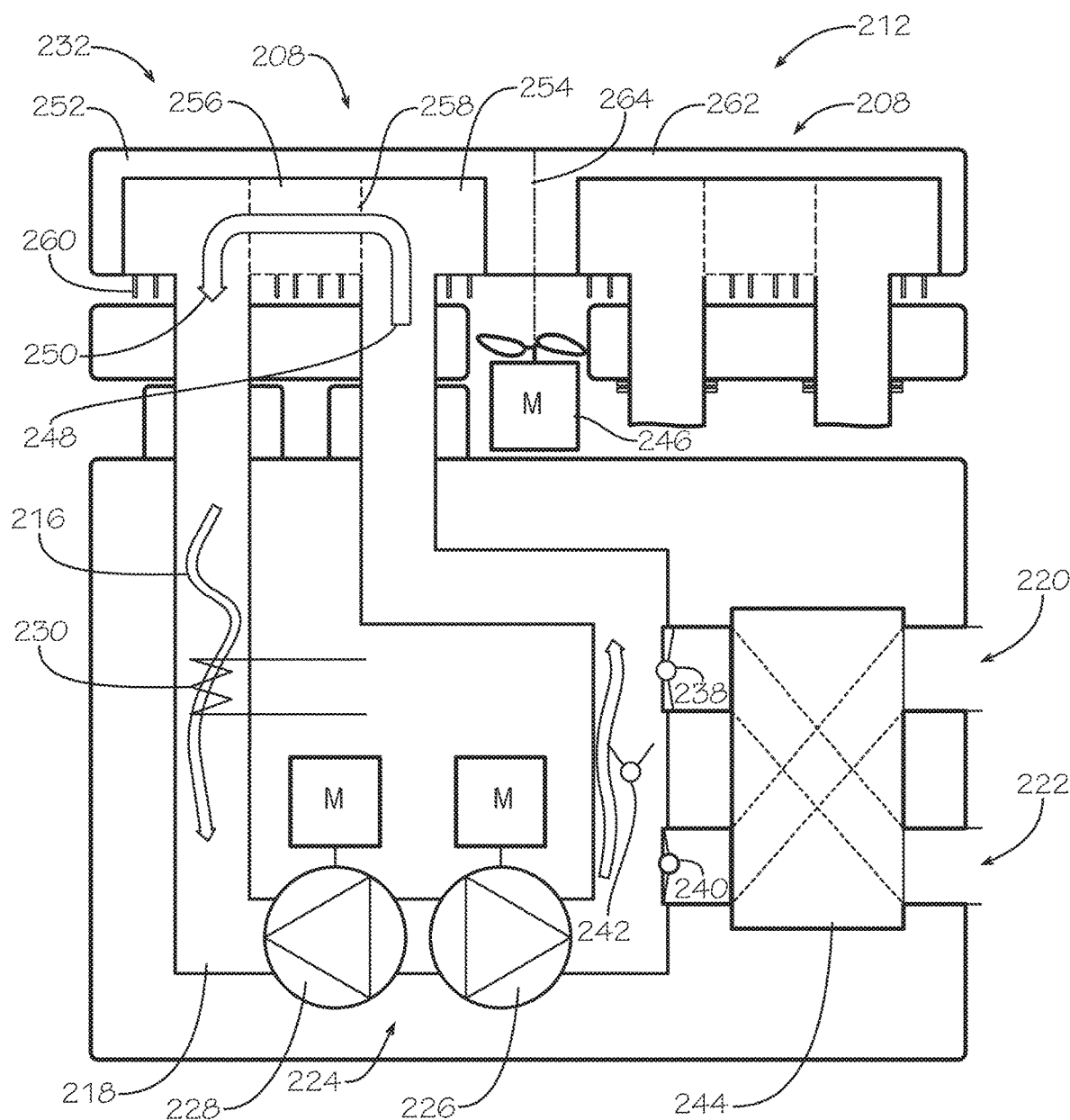
FIG. 21 depicts a heater assembly and a process for heating a sorption cartridge according to an embodiment of the disclosure.
Figure 22:
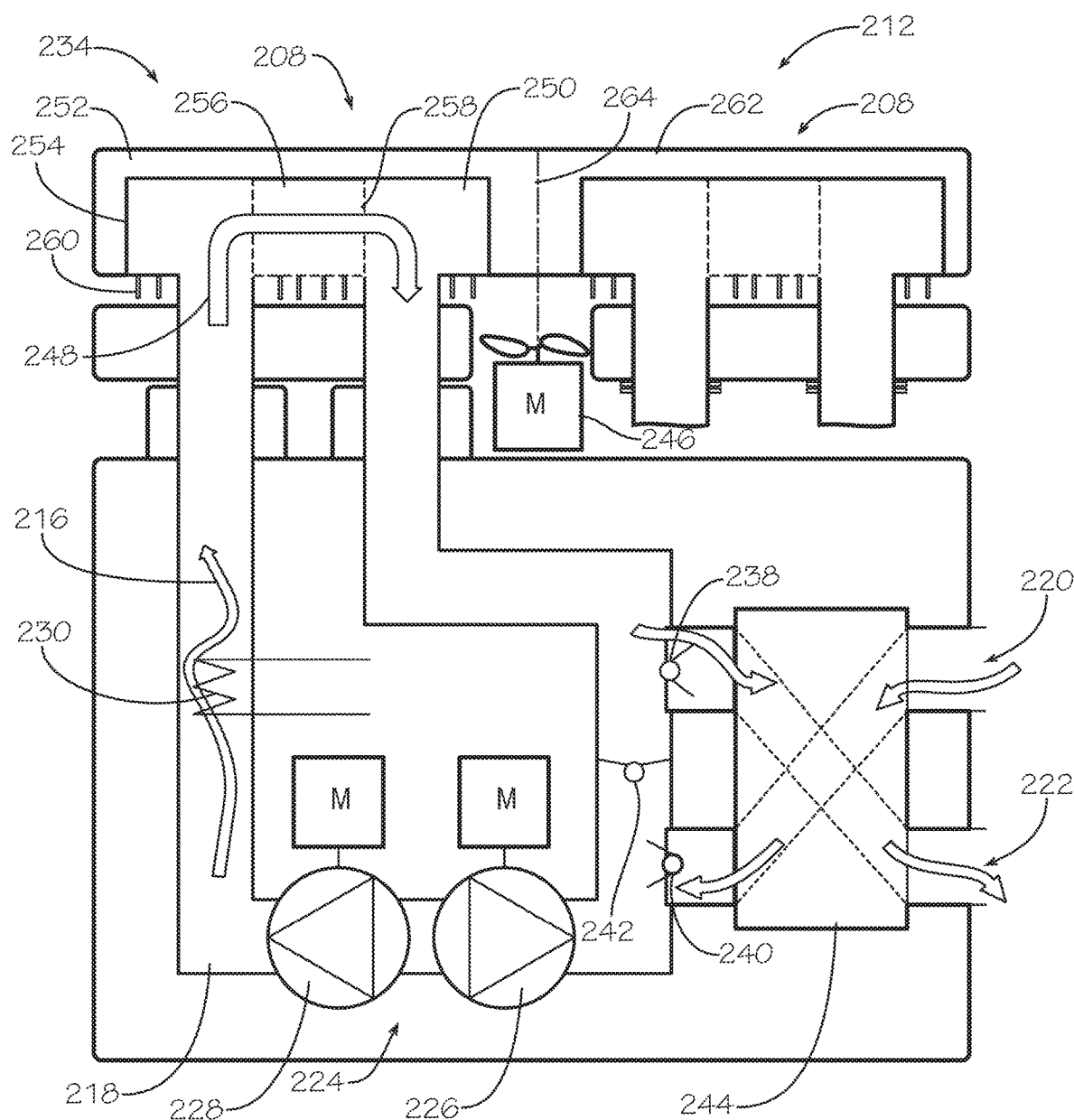
FIG. 22 depicts a heater assembly and a process for regenerating a sorption cartridge according to an embodiment of the disclosure.
Figure 23:
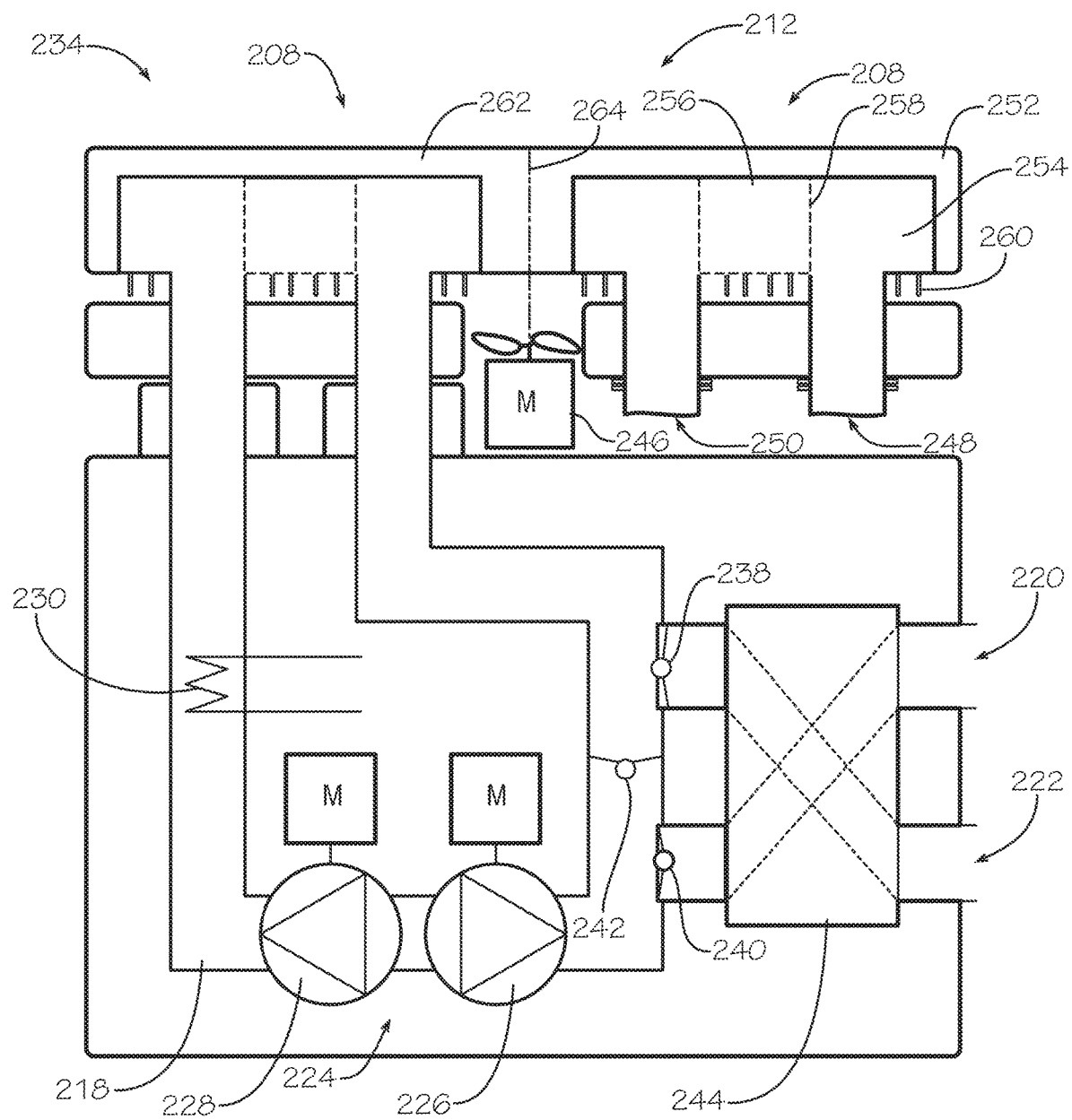
FIG. 23 depicts a heater assembly and a process for cooling a sorption cartridge according to an embodiment of the disclosure.
Figure 24:
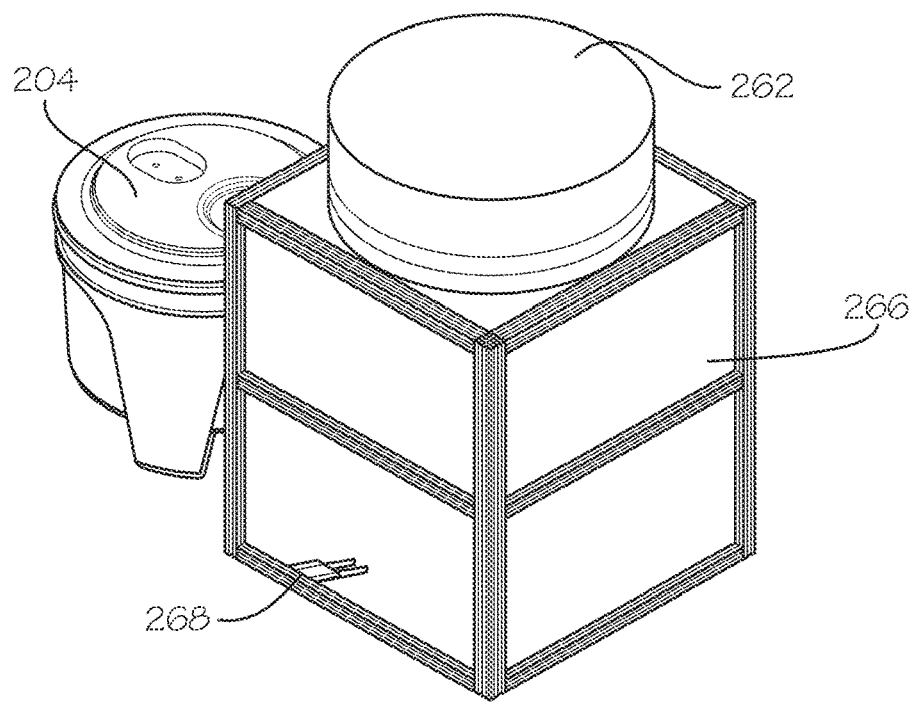
FIG. 24 depicts a system for cooling at least one beverage according to an embodiment of the disclosure.
Figure 25:
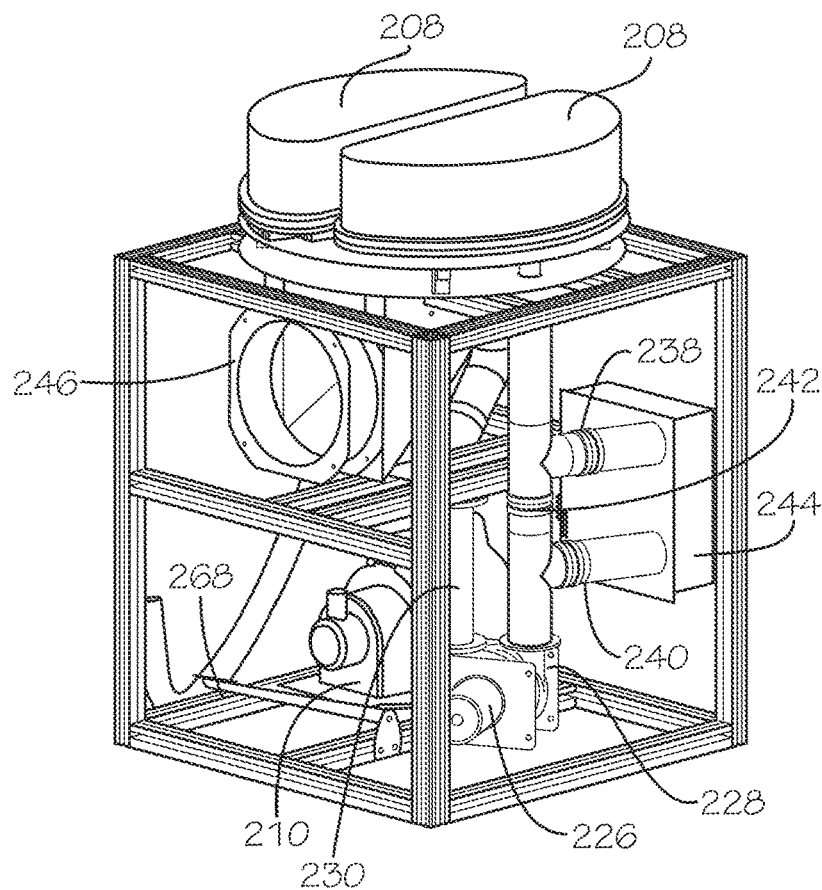
FIG. 25 depicts a system for cooling at least one beverage according to an embodiment of the disclosure.
Figure 26:
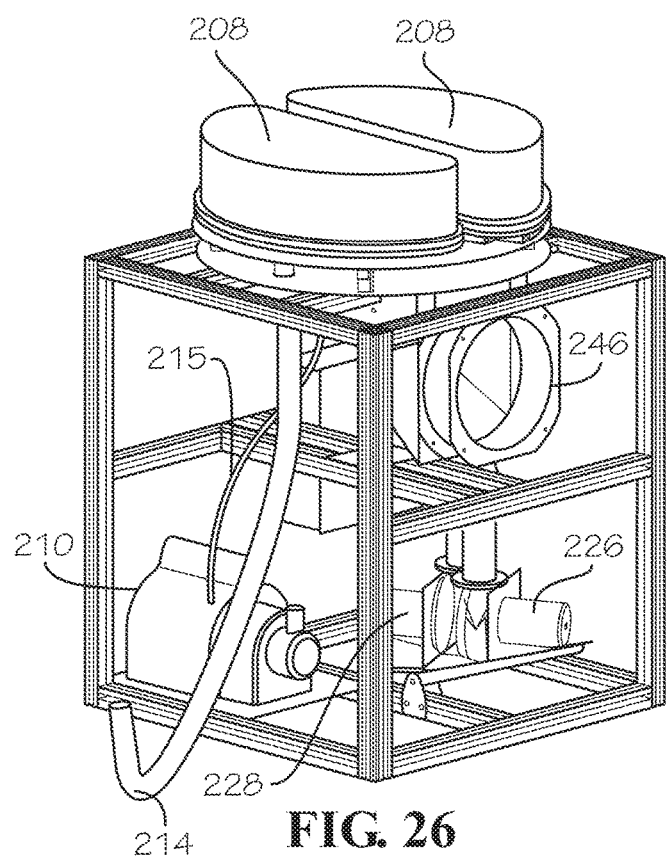
FIG. 26 depicts a system for cooling at least one beverage according to an embodiment of the disclosure.
Figure 27A:
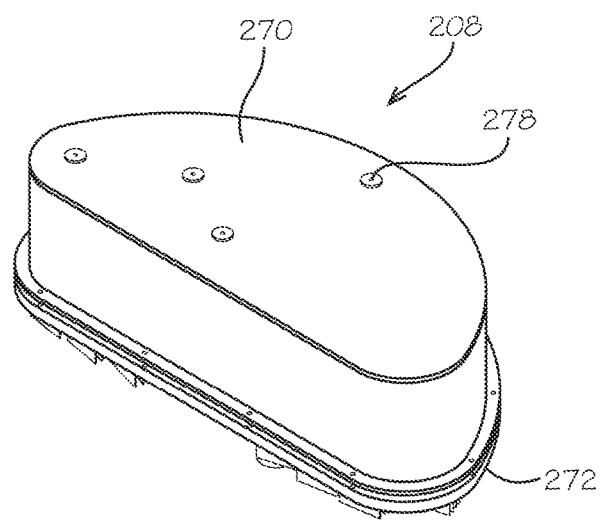
FIGS. 27A-27D depict a sorption cartridge according to an embodiment of the disclosure.
Figure 27B:
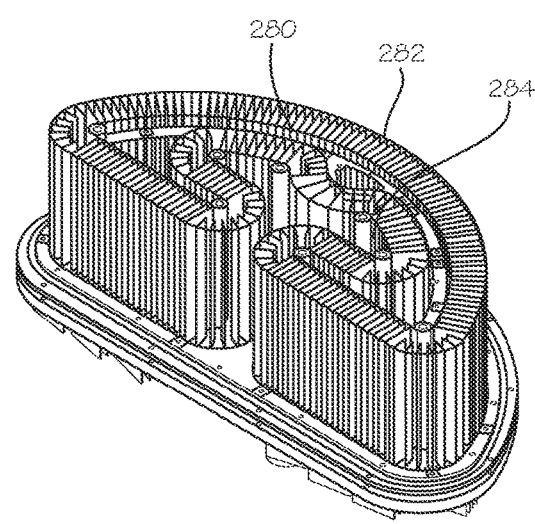
Figure 27C:
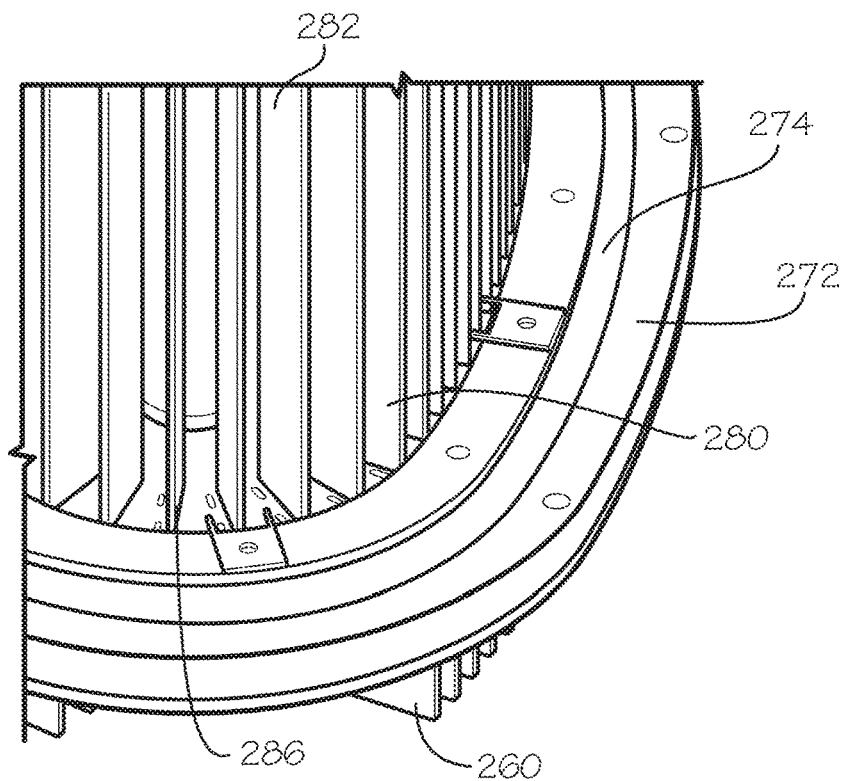
Figure 27D:
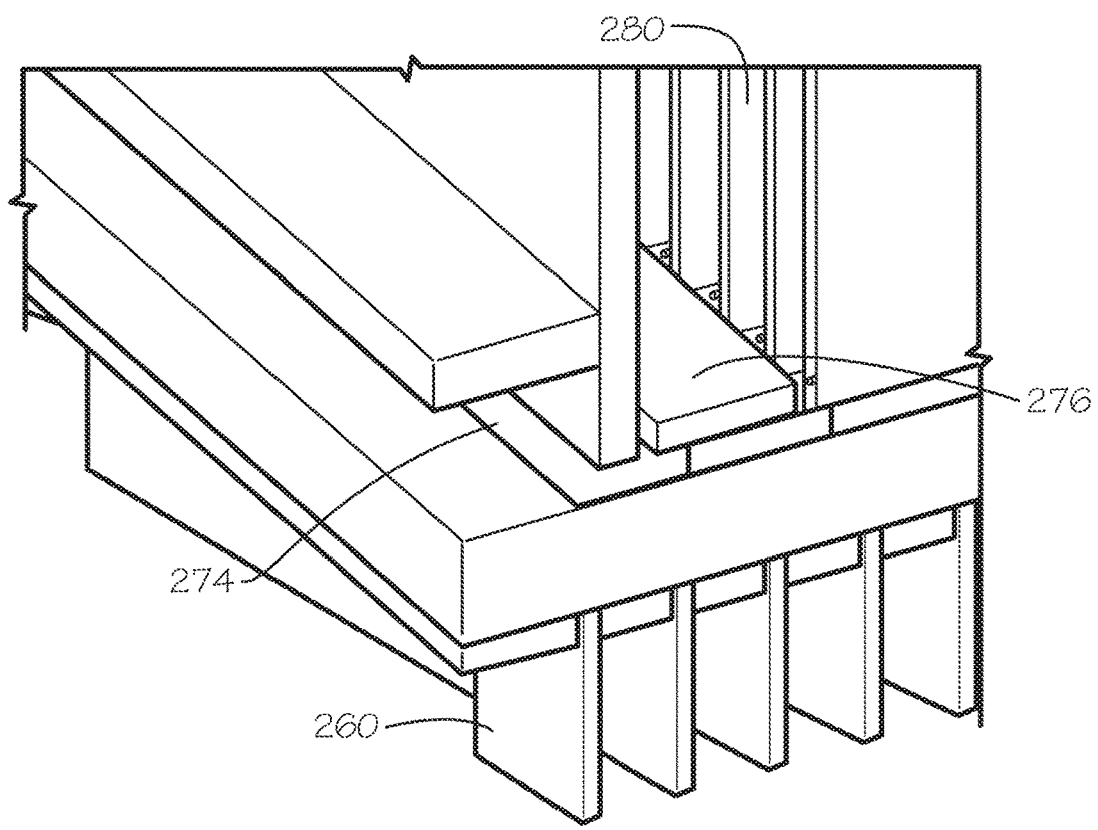

FIGS. 21-23 depict the heater assembly 212. The heater assembly 212 may include a conduit 218. The conduit 218 may include an inlet 220 and an outlet 222. The inlet 220 and the outlet 222 may be switched depending on the configuration of the heating assembly 212. The conduit 218 may be in fluid communication with the sorption cartridge 208. The heater assembly 212 also may include at least one blower 224 in fluid communication with the conduit 218. In some instances, a number of blowers 224 may be used. For example, the heater assembly 212 may include a preheating blower 226 and a drying blower 228. In this manner, the sorption cartridge 208 may be disposed along the conduit 218, and the blower 224 may generate the flow of air 216 through the conduit and sorption cartridge 208.

The heater assembly 212 also may include a heating element 230 disposed within the conduit 218. The heating element 230 may heat the flow of air 216 from the preheating blower 226 and/or the drying blower 228. In some instances, the heated flow of air 216 may pass through the sorption cartridge 208 to remove the captured water therein.

In certain embodiment, the heater assembly 212 may include a preheating mode 232, a drying mode 234, and a cooling mode 236. The heater assembly 212 may include additional or fewer modes. That is, some of the modes may be omitted. To switch between the various modes, an inlet valve 240 may be disposed about the inlet 220 for opening and closing the inlet 220 of the conduit 218, an outlet valve 238 may be disposed about the outlet 222 for opening and closing the outlet 222 of the conduit 218, and a shutoff valve 242 may be disposed within the conduit 218 for switching the conduit between a closed loop and an open loop. In some instances, the valves may be passive check valves. When in the preheating mode 232, as depicted in FIG. 21, the inlet valve 240 may be closed, the outlet valve 238 may be closed, and the shutoff valve 242 may be opened to configure the conduit 218 in the closed loop. In addition, during the preheating mode 232, the preheating blower 226 may be activated to provide a flow of air 216 within the conduit 218, and the heating element 230 may be activated to heat the flow of air 216. The heated flow of air 216 may circulate within the closed loop conduit 218. The preheated flow of air 216 may pass through the sorption cartridge 208 to heat the sorbent material to elevated temperatures needed for regeneration. In some instances, the preheating mode 232 may be omitted.

After a predetermined amount of time, the heater assembly 212 may switch from the preheating mode 232 to the drying mode 234. When in the drying mode 234, as depicted in FIG. 22, the inlet valve 240 may be open, the outlet valve 238 may be open, and the shutoff valve 242 may be closed to enable the flow of air 216 to flow in and out of the inlet 220 and outlet 222 of the conduit 218. In this manner, the conduit 218 is may be in the open loop configuration. In addition, during the drying mode 234, the drying blower 228 may be activated to provide a flow of air 216 within the conduit 218, and the heating element 230 may be activated to heat the flow of air 216. The heated flow of air 216 may pass through the sorption cartridge 208 to absorb the captured water that desorbs from the sorbent material. The flow of air 216 may absorb and transfer the water vapor within the sorption cartridge 208 to the ambient environment via the outlet 222 of the conduit 218. Removal of the water vapor from the sorption cartridge 208 may regenerate the sorption cartridge 208 and enable the sorption cartridge 208 to be reused in the first configuration for cooling the beverage 202. In some instances, the flow of air 216 within the conduit 218 may flow a first direction in the preheating mode 232 and a second direction, which may be opposite the first direction, when in the drying mode 234.

In some instances, the heater assembly 212 may include a heat exchanger 244 disposed about the inlet 220 and outlet 222. For example, the inlet 220 and the outlet 222 of the conduit 218 may flow through passages inside the heat exchanger 244 that provide interfacial area for heat transfer between the inlet and outlet streams. This arrangement may enable heating of the incoming air at the inlet 220 by cooling heated air 216 as it exits through the outlet 222. In this manner, the heat exchanger 244 may capture otherwise wasted heat exiting the outlet 222.

The hot air 216 from the preheating mode 232 and the drying mode 234 may heat the sorption cartridge 208. In some instances, in order to reuse the sorption cartridge 208 in the first configuration, it may need to be cooled. When in the cooling mode 236, as depicted in FIG. 23, the inlet valve 240 may be closed, the outlet valve 238 may be closed, and the shutoff valve 242 may be closed. In addition, a cooling fan 246 may be disposed about the sorption cartridge 208. In the cooling mode 236, the cooling fan 246 may blow ambient (or chilled) air about the sorption cartridge 208 to cool the sorption cartridge 208. After the sorption cartridge 208 has been cooled, it may be reused in the first configuration for cooling the beverage 202. That is, the cooled sorption cartridge 208 may be reattached to the beverage compartment 204 and vacuum pump 210.

In certain embodiments, the sorption cartridge 208 may include an inlet 248, an outlet 250, a support structure 252, a passage 254 within the support structure 252, a sorbent material 256 disposed within the passage 254, and a screen 258 or perforated plate disposed around the sorbent material 256. The inlet 248 and the outlet 250 may be switched depending on the configuration of the heating assembly 212, the beverage compartment 204, and/or the vacuum pump 210. In some instances, the sorbent material 256 may be zeolite. Any suitable sorbent material 256 may be used. In addition, as discussed below, the support structure 252 may comprise an outer casing and internal fins. The sorption cartridge 208 may be any suitable size, shape, or configuration.

In the first configuration, the inlet 248 of the sorption cartridge 208 may be in fluid communication with the beverage compartment 204 via the conduit 214 (such as a hose or the like), and the outlet 250 of the sorption cartridge 208 may be in fluid communication with the vacuum pump 210 via the conduit 215 (such as a hose or the like). When the vacuum pump 210 is activated, the sorption cartridge 208 and the beverage container 204 may be placed under vacuum. As a result, water may evaporate from the wetted material 206 and pass through the conduit 214 into the sorption cartridge 208 via the inlet 248. The water vapor may flow along the passage 254, through the screen 258, and be captured by the sorbent material 256. As the water evaporates from the wetted material 206, the temperature of the wetted material 206 may be lowered, which in turn may cool the beverage 202.

Valves may be incorporated into the system 200 to maintain the appropriate pressure in the beverage compartment 204. For example, the valves may maintain the pressure to prevent freezing of the wetted material 206 around the beverage 202. In some instances, a vacuum valve may be disposed along the conduit 215. In addition, an air pressure valve may be attached to the beverage compartment 204. For example, WO 2015/116903, which is incorporated by reference herein in its entirety, includes a vacuum valve 514 and an air inlet valve 520, which could be included in the system 200 of the present application to control the pressure within the beverage compartment 204. Other valve configurations may be used.

After chilling the beverage 202, the sorbent material 256 may be saturated with water. In order to remove the water from the sorbent material 256, the system 200 may be arranged in the second configuration. In the second configuration, the inlet 248 may be detached from the conduit 214 so that it is no longer in communication with the beverage container 204. Likewise, the outlet 250 may be detached from the conduit 215 so that it is no longer in communication with the vacuum pump 210. Once detached, the inlet 248 and the outlet 250 of the sorption cartridge 208 may be placed in fluid communication with the conduit 218 of the heater assembly 212. The heater assembly 212 may then remove the water vapor from the sorbent material 256 by providing a heated flow of air 216 via the preheating mode 232, the drying mode 234, or a combination thereof. Next, the sorption cartridge 208 may be cooled via the cooling mode 236.

In some instances, in order to facilitate cooling of the sorption cartridge 208, the support structure 252 may include at least one heat exchanger fin 260 extending therefrom. Any number of heat exchanger fins 260 may be used. In addition, the sorption cartridge 208 may include a number of sorption cartridges 208. The multiple sorption cartridges 208 may be arranged on a carrousel 262 that pivots about an axis 264 between the first configuration and the second configuration. In this manner, while one of the sorption cartridges 208 is being used to cool the beverage 202 in the first configuration, the other sorption cartridge 208 may be regenerated in the second configuration. The sorption cartridges 208 may be rotated over and over between the first and second configurations to continually cool the beverages 202 and be regenerated. In some instances, at least some of the components of the system 200 may be stored in an insulated cabinet 266. Furthermore, a pedal 268 (or handle) may be manipulated by a user to decouple the sorption cartridges so that the carousel 262 may be rotated between the first and second configurations.

FIGS. 27A-27D depict one example embodiment of the sorption cartridge 208. The sorption cartridge 208 may include a cover 270 attached to a base 272. The cover 270 and the base 272 may form a hermetic seal therebetween. For example, a seal 274 and one or more plates 276 between the cover 270 and the base 272 may provide an air tight enclosure capable of supporting a vacuum therein. In some instances, the cover 270 may include at least one cartridge 278 that is at least partially disposed in the sorbent material 256 within the enclosure. The cartridge 278 may enable temperature reading of the sorbent material 256 within the enclosure. A number of fins 280 may be disposed between a wire mesh 282 or the like. The sorbent material 256 may be disposed within the wire mesh 282 between the fins 280. Pillars, plates, and/or brackets 284 may support and hold the wire mesh 282 and fins 280 in place. The fins 280 may be disposed within slots 286 in the base 272. The bottom of the base 272 may include the heat exchanger fins 260. The sorption cartridge 208 may be any size, shape, or configuration.

FIGS. 28-36 depict a system 300 (or portions thereof) for cooling at least one beverage. The system 300 may include at least one sorption cartridge 302. In certain embodiments, the sorption cartridge 302 may include an inlet 304, an outlet 306, a support structure 308, a passage 310 about the support structure 308, a sorbent material 312 disposed about the passage 310, and a screen 314 or perforated plate disposed around the sorbent material 312. In some instances, the sorbent material 312 may be zeolite. Any suitable sorbent material 312 may be used. Heating elements 316 may be incorporated into the support structure 308. In addition, the sorption cartridge 302 may include a fan 318 and insulation 320. The sorption cartridge 302 may be any suitable size, shape, or configuration.

Figure 36:
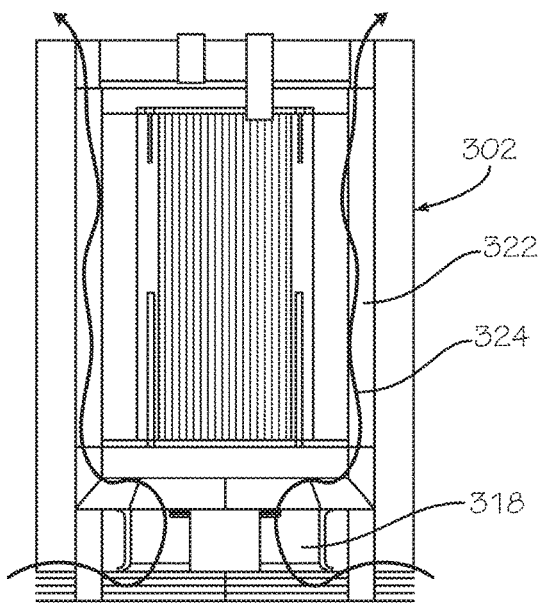
FIG. 36 depicts a cross-section of a sorption cartridge and a blower assembly and a process for cooling the sorption cartridge according to an embodiment of the disclosure.

In a first configuration, as depicted in FIG. 36, the inlet 304 of the sorption cartridge 302 may be in fluid communication with a beverage compartment, and the outlet 306 of the sorption cartridge 302 may be in fluid communication with a vacuum pump. When the vacuum pump is activated, the sorption cartridge 302 and the beverage container may be placed under vacuum. As a result, water may evaporate from a wetted material disposed about a beverage and pass through the sorption cartridge 302 via the inlet 304. The water vapor may flow along the passage 310, through the screen 314, and be captured by the sorbent material 312. As the water evaporates from the wetted material, the temperature of the wetted material may be lowered, which in turn may cool the beverage. During this process, the fan 318 may blow air along the sorbent material through a cooling passage 322.

Figure 33:
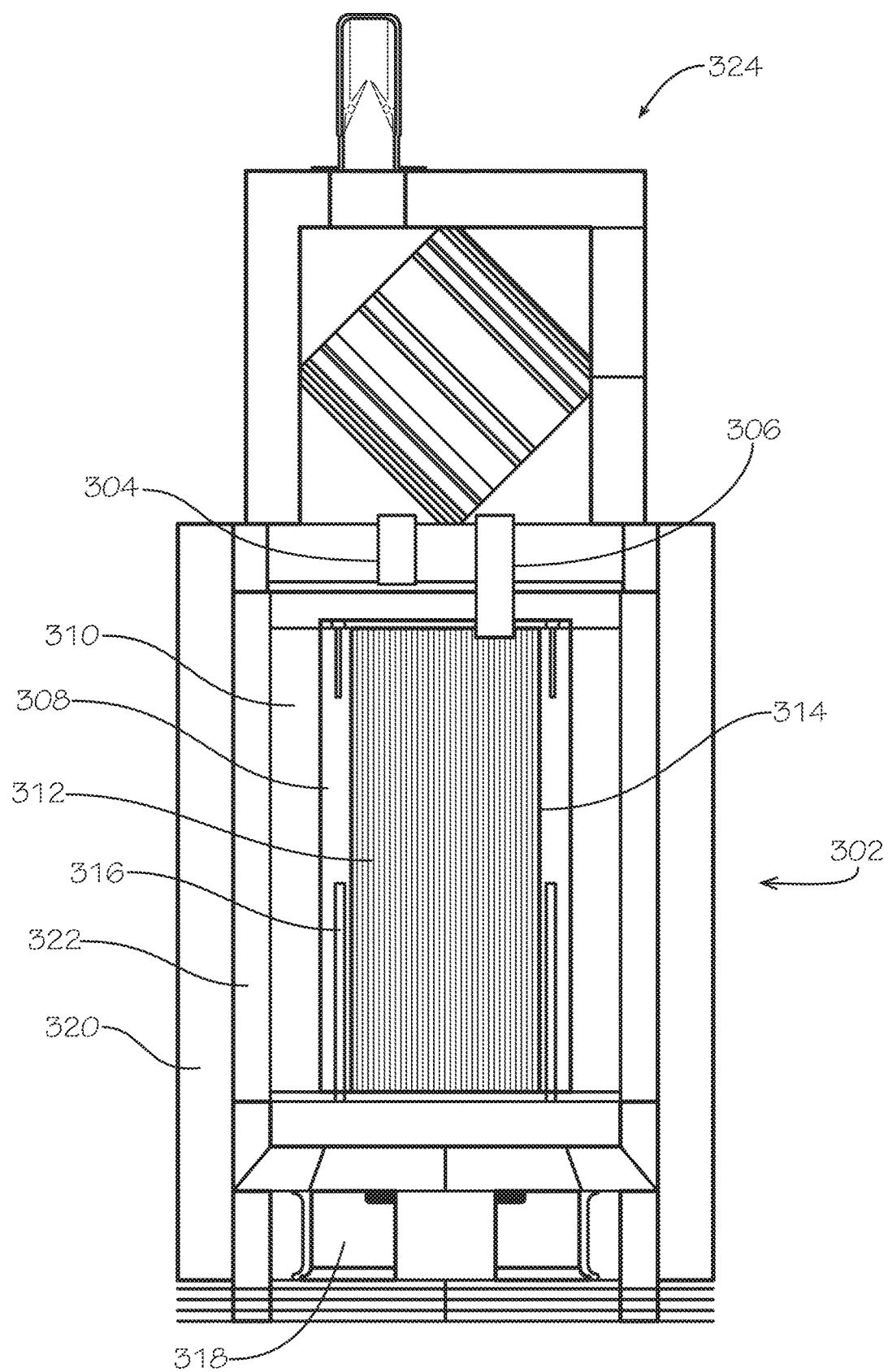
FIG. 33 depicts a cross-section of a sorption cartridge and a blower assembly according to an embodiment of the disclosure.

After chilling the beverage, the sorbent material 312 may be saturated with water. The system 300 may include a second configuration for regenerating the sorption cartridge 302. In the second configuration, the sorption cartridge 302 may be detached from the beverage compartment and vacuum pump. In such instances, as depicted in FIGS. 31-33, a blower assembly 324 may be attached to the inlet 304 and the outlet 306 of the sorption cartridge 302. In some instances, the second configuration may include a preheating mode and a drying mode. Fewer or additional modes may be included.

Figure 34:
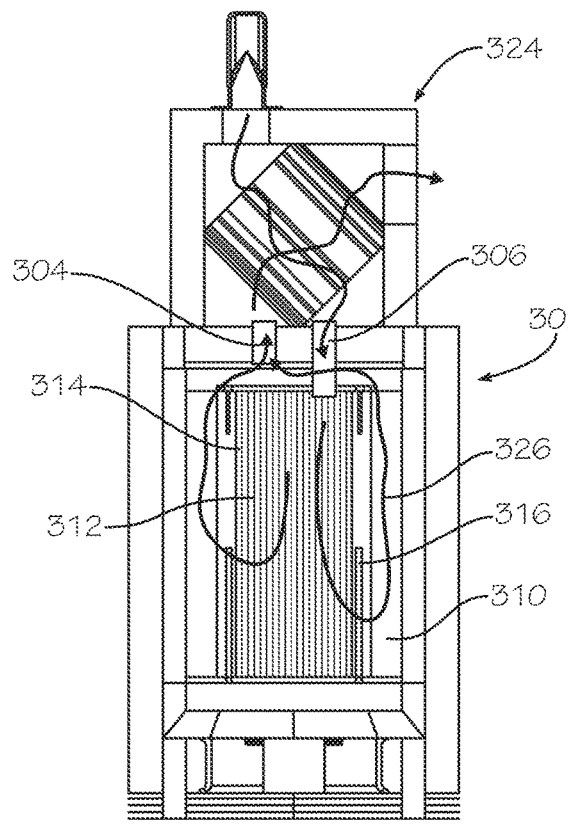
FIG. 34 depicts a cross-section of a sorption cartridge and a blower assembly and a process for regenerating the sorption cartridge according to an embodiment of the disclosure.
Figure 35:
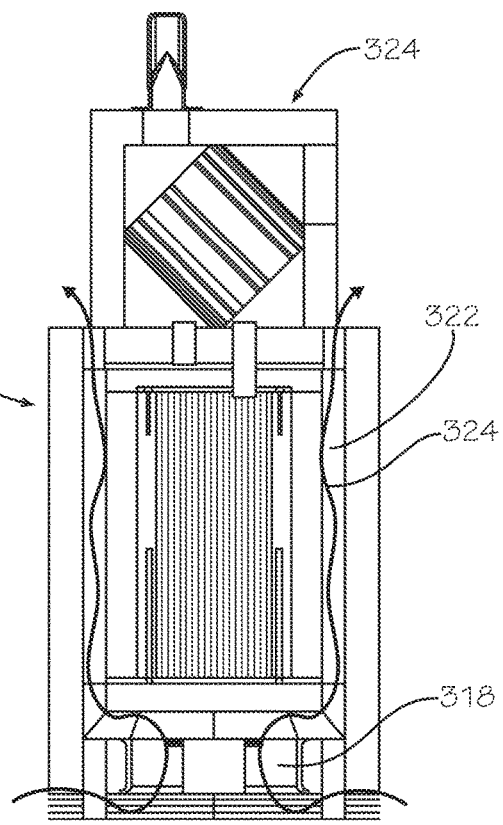
FIG. 35 depicts a cross-section of a sorption cartridge and a blower assembly and a process for cooling the sorption cartridge according to an embodiment of the disclosure.

In the preheating mode, as depicted in FIG. 33, the heating elements 316 may heat the sorbent material 312 to elevated temperatures needed for regeneration. In some instances, the preheating mode may be omitted. After a predetermined amount of time, the second configuration may switch from the preheating mode to the drying mode. When in the drying mode, as depicted in FIG. 34, the inlet 304 and the outlet 306 may be open to enable a flow of air 326 to flow in and out of the inlet 304 and outlet 306 and through the passage 310. In addition, during the drying mode, the blower assembly 324 may be activated to provide the flow of air 326 within the passage 310, and the heating elements 316 may be activated to heat the sorbent material 312 and/or the flow of air 326. The flow of air 326 may pass through the sorption cartridge 302 to absorb the captured water that desorbs from the sorbent material 312. The flow of air 326 may absorb and transfer the water vapor within the sorption cartridge 302 to the ambient environment via the outlet 306. Removal of the water vapor from the sorption cartridge 302 may regenerate the sorption cartridge 302 and enable the sorption cartridge 302 to be reused in the first configuration for cooling the beverage.

The system 300 also may include a cooling mode. In the cooling mode, the fan 318 may blow ambient (or chilled) air about the sorption cartridge 302 to cool the sorption cartridge 302. For example, during the cooling mode, the fan 318 may blow air 324 along the sorbent material 312 through the cooling passage 322. After the sorption cartridge 302 has been cooled, it may be reused in the first configuration for cooling the beverage. That is, the cooled sorption cartridge 320 may be reattached to the beverage compartment and vacuum pump.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system for cooling at least one product, the system comprising:
   a product compartment with the at least one product positioned therein;
   a wetted material disposed about the at least one product;
   at least one sorption cartridge;
   a vacuum pump; and
   a solar reflector panel,
   wherein when in a first configuration, the at least one sorption cartridge is in fluid communication with the product compartment and the vacuum pump is in fluid communication with the at least one sorption cartridge to create a vacuum in the at least one sorption cartridge and the product compartment, causing water to evaporate from the wetted material and be captured by the at least one sorption cartridge, thereby lowering the temperature of the wetted material and in turn cooling the at least one product,
   wherein when in a second configuration, the at least one sorption cartridge is detached from the vacuum pump and the product compartment and disposed within the solar reflector panel to discharge the captured water therein by way of solar energy.

2. The system of claim 1, wherein the at least one sorption cartridge comprises:
   an inlet;
   an outlet;
   a support structure;
   a passage within the support structure;
   a sorbent material disposed within the support structure; and
   a screen or perforated plate disposed about the sorbent material.

3. The system of claim 2, wherein the at least one sorption cartridge comprises a transparent vacuum insulated outer shell disposed about the support structure.

4. The system of claim 2, wherein the inlet and the outlet are disposed at the same end of the at least one sorption cartridge.

5. The system of claim 2, wherein the inlet and the outlet are disposed at opposite ends of the at least one sorption cartridge.

6. The system of claim 5, wherein the at least one sorption cartridge comprises an inlet end cap at the inlet and an outlet end cap at the outlet.

7. The system of claim 6, wherein the inlet end cap, the outlet end cap, or both are removable.

8. The system of claim 2, further comprising a blower attached to the inlet for forcing air through the passage when in the second configuration.

9. The system of claim 1, further comprising a vacuum manifold disposed in fluid communication between the vacuum pump and the at least one sorption cartridge.

10. The system of claim 1, further comprising a vapor manifold disposed in fluid communication between the product compartment and the at least one sorption cartridge.

* * * * *